(12) United States Patent
McKenna et al.

(10) Patent No.: US 6,907,023 B2
(45) Date of Patent: Jun. 14, 2005

(54) COMMUNIQUE SYSTEM WITH DYNAMIC BANDWIDTH ALLOCATION IN CELLULAR COMMUNICATION NETWORKS

(75) Inventors: Daniel B. McKenna, Steamboat Springs, CO (US); James M. Graziano, Platteville, CO (US)

(73) Assignee: Vesuvius, Inc., San Diego, CA (US)

( * ) Notice: Subject to any disclaimer, the term of this patent is extended or adjusted under 35 U.S.C. 154(b) by 684 days.

(21) Appl. No.: 09/736,475

(22) Filed: Dec. 13, 2000

(65) Prior Publication Data

US 2002/0018450 A1 Feb. 14, 2002

Related U.S. Application Data

(63) Continuation-in-part of application No. 09/638,744, filed on Aug. 14, 2000.

(51) Int. Cl.[7] .................... H04Q 7/00; H04B 7/216
(52) U.S. Cl. ................. 370/342; 370/328; 370/330; 455/464
(58) Field of Search ..................... 370/277, 328, 370/338, 329, 401, 342, 343, 330, 347; 455/422.1, 428, 464

(56) References Cited

U.S. PATENT DOCUMENTS

| 5,553,315 A | 9/1996 | Sobti et al. |
| 5,613,191 A | 3/1997 | Burton |

(Continued)

FOREIGN PATENT DOCUMENTS

| EP | 0837609 A2 | 4/1998 |
| EP | 1037434 A1 | 9/2000 |

(Continued)

OTHER PUBLICATIONS

Gubbi R "Multimedia streams and quality of service in the next generation wireless home networks" Mobile Multimedia Communications, 1999 . . . .

Dong–Hoon, Nam, et al. Adaptive Multimedia Stream Presentation i Mobile Computing Environment.

*Primary Examiner*—Duc Ho
(74) *Attorney, Agent, or Firm*—Sandip (Micky) S. Minhas; Phil Wadsworth

(57) ABSTRACT

The communique system for cellular communication networks operates with existing cellular communication networks to provide communique communication services to subscribers. The communique can be unidirectional (broadcast) or bidirectional (interactive) in nature and the extent of the communique can be network-wide broadcast or narrowcast, where one or more cells and/or cell sectors are grouped to cover a predetermined geographic area or demographic population or subscriber interest group to transmit information to subscribers who populate the target audience for the narrowcast transmissions. The communique system for cellular communication networks can dynamically allocate the available bandwidth to thereby serve subscribers with more control channel(s) and/or control channel bandwidth and/or communication channels and/or communication channels of greater bandwidth as the need presents itself. The dynamic bandwidth allocation can simultaneously occur in multiple domains: time, code, frequency to thereby serve the needs of the subscribers to receive Communiques. The content of these transmissions can be multimedia in nature and comprising a combination of various forms of media: audio, video, graphics, text, data and the like. The subscriber terminal devices used to communicate with the communique system for cellular communication networks are typically full function communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device.

41 Claims, 13 Drawing Sheets

U.S. PATENT DOCUMENTS

| | | |
|---|---|---|
| 5,852,775 A | 12/1998 | Hidary |
| 6,026,289 A | 2/2000 | Zellner et al. |
| 6,169,894 B1 | 1/2001 | McCormick et al. |
| 6,442,258 B1 * | 8/2002 | Mashinsky ............. 379/114.02 |
| 6,612,932 B2 * | 9/2003 | Stern ........................... 463/42 |
| 2002/0075155 A1 | 6/2002 | Guillory |

FOREIGN PATENT DOCUMENTS

| | | |
|---|---|---|
| WO | WO 98/10604 A1 | 3/1998 |
| WO | WO 99/07168 A1 | 2/1999 |
| WO | WO 99/59355 A2 | 11/1999 |
| WO | WO 99/66670 A1 | 12/1999 |
| WO | WO 00/02389 A1 | 1/2000 |
| WO | WO 00/27080 A1 | 5/2000 |
| WO | WO 00 79734 A | 12/2000 |

* cited by examiner

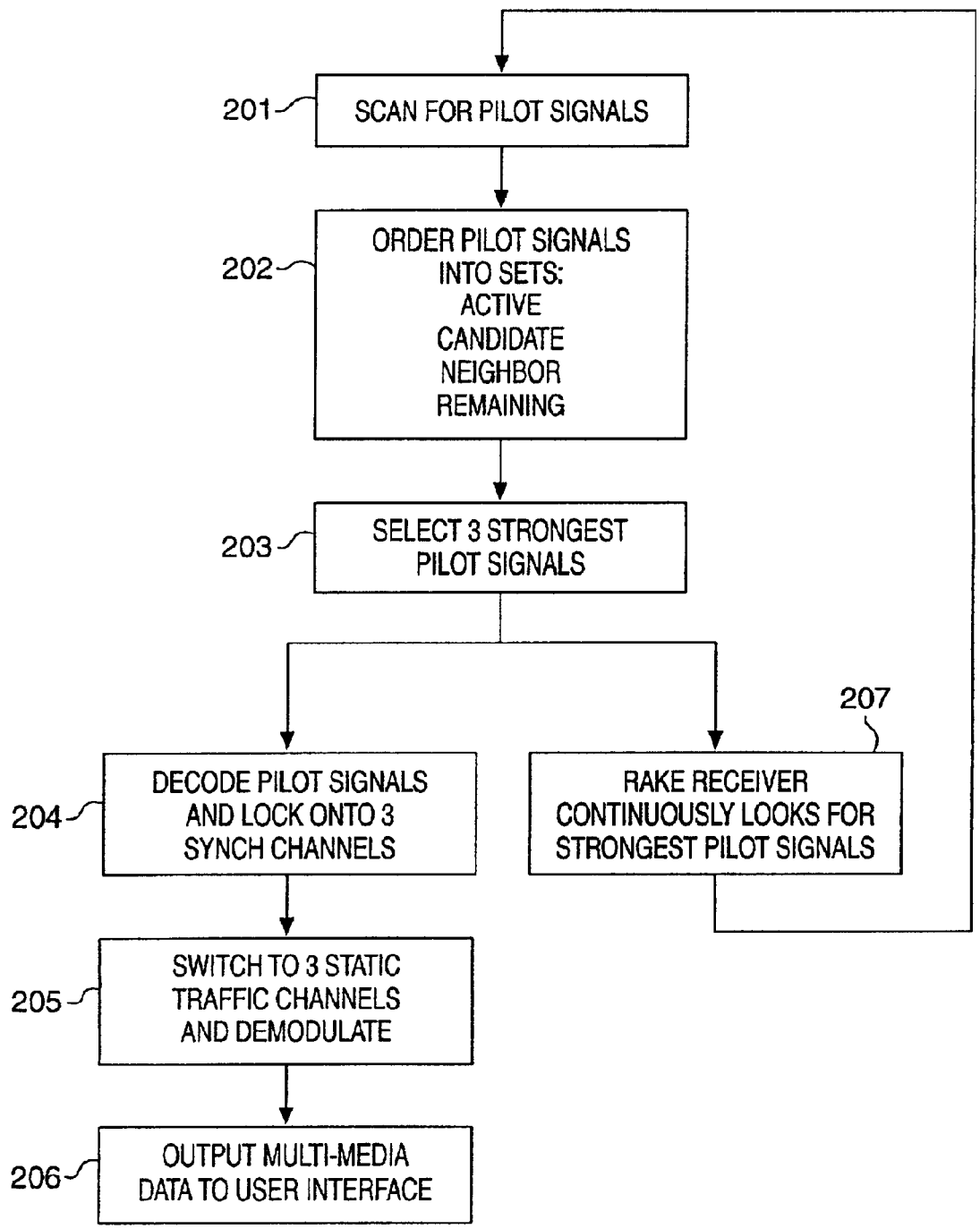

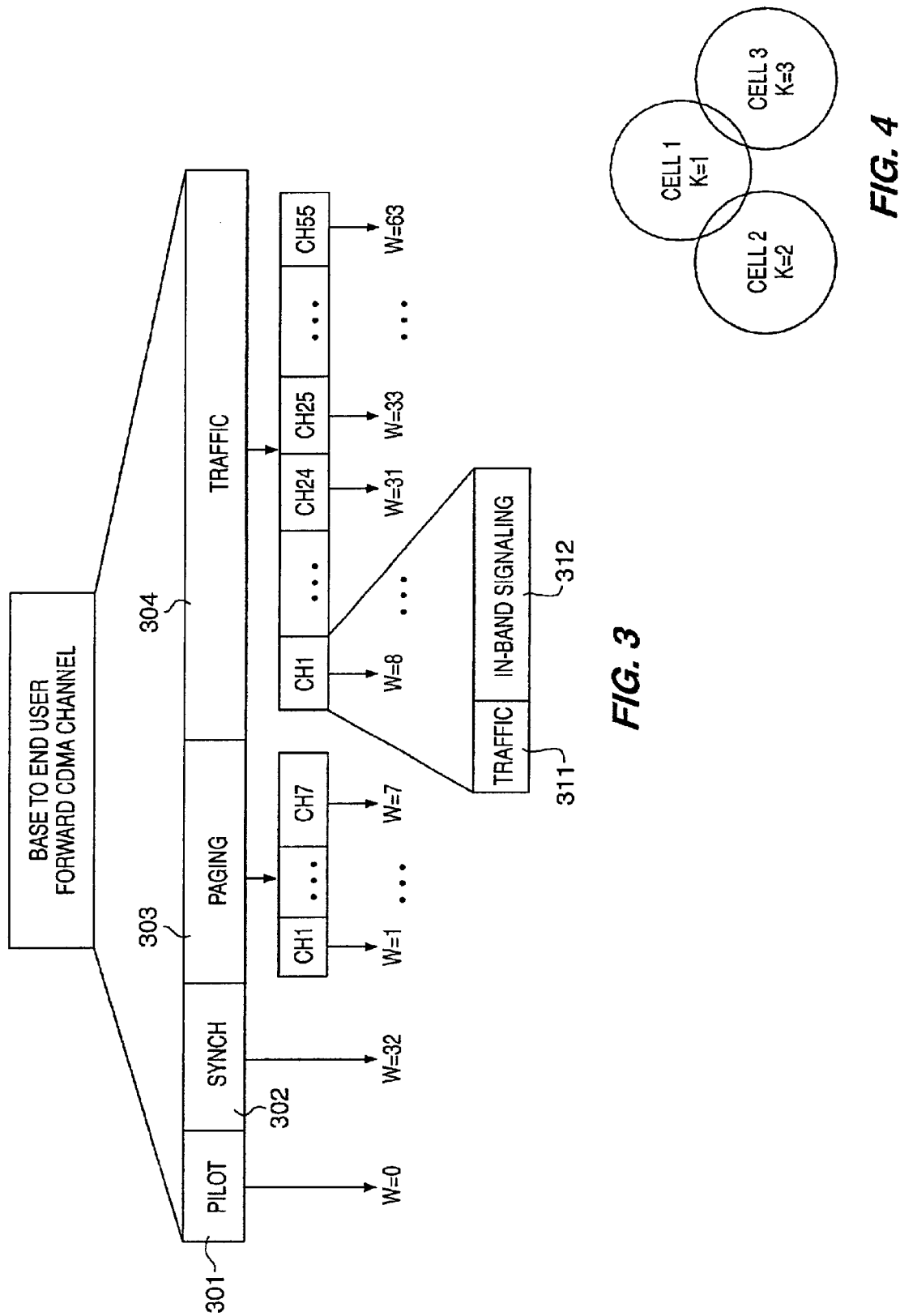

| COMMUNIQUE | TIME | NARROWCAST REGION |
|---|---|---|
| A | 6AM-10AM DAILY | 910 |
| B | 6AM-10AM DAILY | 922 |
| C | 6AM-11PM AS REQUIRED | 909 |
| . | . | . |
| . | . | . |
| . | . | . |
| M | 3PM-7PM | 923 |
| N | 6PM-11PM | 909 |
| . | . | . |
| . | . | . |

*FIG. 14*

COMMUNIQUE SYSTEM WITH DYNAMIC BANDWIDTH ALLOCATION IN CELLULAR COMMUNICATION NETWORKS

CROSS REFERENCE TO RELATED APPLICATIONS

This application is a continuation-in-part of U.S. patent application Ser. No. 09/638,744, titled "Communique System for Cellular Communication Networks" and filed on Aug. 14, 2000.

FIELD OF THE INVENTION

This invention relates to cellular communication networks and to a communique system that makes use of the bandwidth capacity in existing point-to-point cellular communication networks to provide subscribers with access to a plurality of broadcast and narrowcast based services.

PROBLEM

It is a problem in cellular communication networks that the network topology is exclusively point to point in nature. This paradigm represents the historical view of cellular communications as a wireless equivalent of traditional wireline telephone communication networks, which serve to interconnect a calling party with a called party. An additional problem in cellular communication networks is that the need to concurrently serve many voice subscribers with the limited bandwidth available in cellular communication networks has prevented the provision of wide bandwidth communication services, such as data, to these subscribers.

The third generation (3G) wireless communication systems, as specified by the ITU/IMT-2000 requirements for cellular communications, represent a step toward solving the above-noted problems. The third generation wireless communication systems support the provision of advanced packet data services. In 3G/IMT-2000 systems, dynamic Internet Protocol address assignment is required in addition to static Internet Protocol (IP) address assignment. With static IP address assignment, the wireless subscriber station's static IP address is fixed and assigned by the home wireless network. When the wireless subscriber station is away from its home wireless network (roaming), a special data communications link (Wireless IP tunnel) needs to be established between the visited wireless network and the home wireless network. In this case, IP packets destined to the wireless subscriber station's IP address of the home wireless network are routed to the home wireless network according to standard IP routing. A Wireless IP tunnel is used in the home wireless network to redirect the IP packets that are destined to the wireless subscriber station's static IP address to the visited wireless network where the roaming wireless subscriber station is located and being served. When a wireless subscriber station moves from one wireless network coverage area to another, Wireless IP mobility binding updates are performed between the wireless subscriber station and its Home Agent (HA) in the home wireless network. Since both the wireless station's IP address and its Home Agent IP address are static or fixed, a shared secret between the wireless subscriber station and the Home Agent can be preprogrammed into the wireless station and its Home Agent so that the Home Agent can authenticate Wireless IP registrations requested by the wireless subscriber station and perform mobility binding updates in a secure manner.

However, even with advances in bandwidth utilization and the provision of packet data services, the cellular communication networks still operate on a point to point paradigm, with the networks being unable to concurrently communicate data to a plurality of subscribers, which is the fundamental concept of broadcast communications, especially in the case of a dynamically changing audience for the broadcasts.

SOLUTION

The above described problems are solved and a technical advance achieved by the communique system for cellular communication networks that operates with existing cellular communication networks to provide communique communication services to subscribers. The Communique can be unidirectional (broadcast) or bidirectional (interactive) in nature and the extent of the Communique can be network-wide broadcast or narrowcast, where one or more cells and/or cell sectors are grouped to cover a predetermined geographic area or demographic population or subscriber interest group to transmit information to subscribers who populate the target audience for the narrowcast transmissions. The communique system for cellular communication networks can dynamically allocate the available bandwidth to thereby serve subscribers with more control channel(s) and/or control channel bandwidth and/or communication channels and/or communication channels of greater bandwidth as the need presents itself. The dynamic bandwidth allocation can simultaneously occur in multiple domains: time, code, frequency to thereby serve the needs of the subscribers to receive Communiques.

The content of these transmissions can be multi-media in nature and comprising a combination of various forms of media: audio, video, graphics, text, data and the like. The subscriber terminal devices used to communicate with the communique system for cellular communication networks are typically full function communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device. The subscriber terminal devices can either be mobile wireless communication devices in the traditional mobile subscriber paradigm, or the fixed wireless communication devices in the more recent wireless product offerings. Furthermore, these communique communication services can be free services, subscription based services, or toll based services, while the data propagation can be based on push, pull and combinations of push/pull information distribution modes.

BRIEF DESCRIPTION OF THE DRAWINGS

FIG. 2 illustrates in flow diagram form the operation of a typical cellular communication system in implementing an idle handoff mode of operation;

FIG. 3 illustrates in block diagram form a typical configuration of the base to end user forward CDMA channel used in cellular communication networks;

FIG. 4 illustrates in block diagram form a typical assignment of cells in a cellular communication network for a unidirectional transmission without subscriber registration mode of operation of the present communique system for cellular communication networks;

FIG. 14 illustrates in tabular form a typical definition of a plurality of narrowcasts applicable to the program streams of FIG. 13 as applied to the typical dynamic coverage areas of FIGS. 9 & 10;

DETAILED DESCRIPTION

Existing cellular communication networks are designed with a network topology that is exclusively point to point in nature. This paradigm represents the historical view of cellular communications as a wireless equivalent of traditional wire-line telephone communication networks, which serve to interconnect a calling party with a called party. The need to concurrently serve many voice subscribers with the limited bandwidth available in cellular communication networks has also prevented the provision of wide bandwidth communication services to these subscribers. These existing systems are largely static in their operation, with each cell providing point to point communications to a population of subscribers who reside in or roam into the predefined service area of the cell. There is an absence of a capability to provide a communication service to a subscriber population that comprises a dynamically changing coverage area that spans multiple cells. The dynamic convergence of a plurality of subscribers to constitute a target audience for Communiques is a paradigm that is not addressed by existing cellular communication systems, nor is there any functionality suggested in existing cellular communication systems to deal with providing information relevant to this target audience in a real time manner.

Cellular Communication Network Philosophy

Figure 1A:
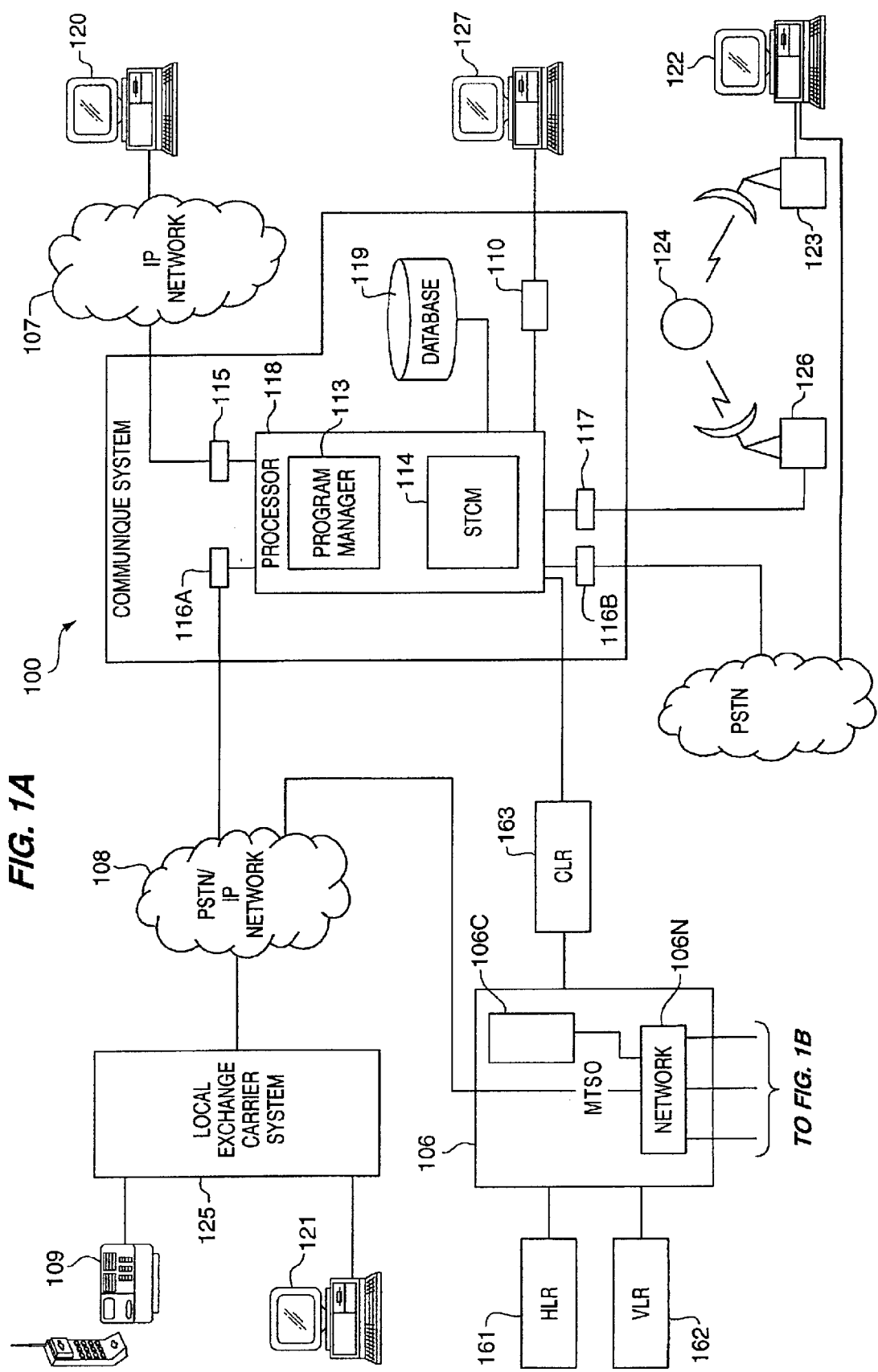
FIGS. 1A & 1B illustrate in block diagram form the overall architecture of a typical cellular communication network that is equipped with the present communique system for cellular communication networks.
Figure 1B:
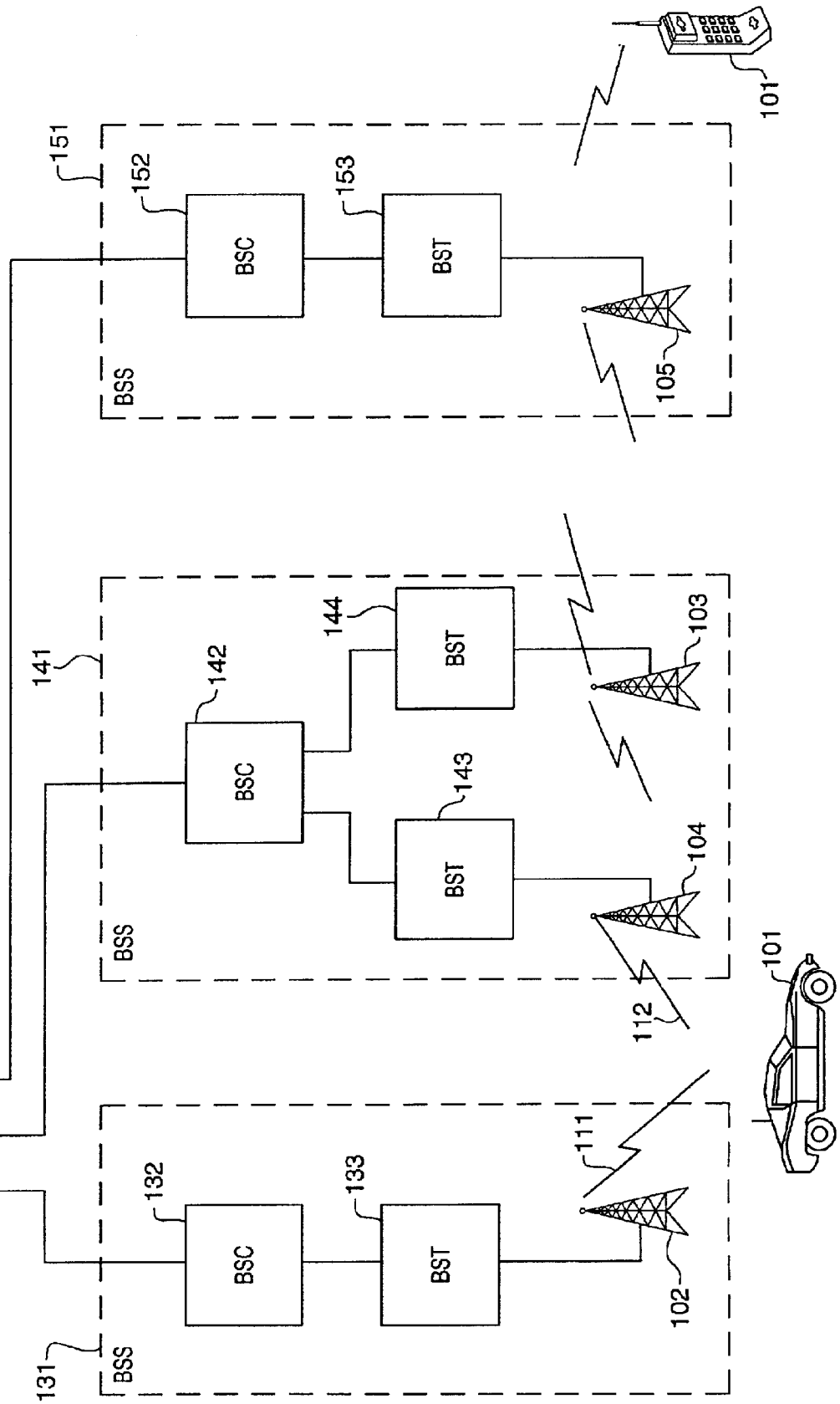

Cellular communication networks as shown in block diagram form in FIGS. 1A & 1B, provide the service of connecting wireless telecommunication customers, each having a wireless subscriber device, to both land-based customers who are served by the common Carrier Public Switched Telephone Network (PSTN) 108 as well as other wireless telecommunication customers. In such a network, all incoming and outgoing calls are routed through Mobile Telephone Switching Offices (MTSO) 106, each of which is connected to a plurality of cell sites (also termed Base Station Subsystems 131–151) which communicate with wireless subscriber devices 101, 101' located in the area covered by the cell sites. The wireless subscriber devices 101, 101' are served by the cell sites, each of which is located in one cell area of a larger service region. Each cell site in the service region is connected by a group of communication links to the Mobile Telephone Switching Office 106. Each cell site contains a group of radio transmitters and receivers (Base Station Transceiver 132, 142, 143, 152) with each transmitter-receiver pair being connected to one communication link. Each transmitter-receiver pair operates on a pair of radio frequencies to create a communication channel: one frequency to transmit radio signals to the wireless subscriber device and the other frequency to receive radio signals from the wireless subscriber device. The first stage of a cellular communication connection is set up when a transmitter-receiver pair in a cell site 131, operating on a predetermined pair of radio frequencies, is turned on and a wireless subscriber device 101, located in the cell site 131, is tuned to the same pair of radio frequencies to thereby activate a communication channel between the wireless subscriber device 101 and the cell site 131. The second stage of the communication connection is between the communication link connected to this transmitter-receiver pair and the common carrier Public Switched Telephone Network 108. This second stage of the communication connection is set up in the Mobile Telephone Switching Office 106, which is connected to the common carrier Public Switched Telephone Network 108 by incoming and outgoing trunks. The Mobile Telephone Switching Office 106 contains a switching network 106N to switch wireless subscriber voice and/or data signals from the communication link to an incoming or outgoing trunk. The Mobile Telephone Switching Office 106 and associated software typically manages the base station controllers 132, 142, 152 and the Base Station Transceiver Transmit/Receive electronics which serve to implement the wireless radio frequency link to the wireless subscriber devices 101.

The Mobile Telephone Switching Office 106, in conjunction with the Home Location Register (HLR) 161 and the Visitor Location Register (VLR) 162, manages subscriber registration, subscriber authentication, and the provision of wireless services such as voice mail, call forwarding, roaming validation and so on. The Mobile Telephone Switching Office Controller 106C also controls the actions of the associated base station controllers 132, 142, 152 by generating and interpreting the control messages that are exchanged with the associated base station controllers 132, 142, 152 over data links that interconnect these subsystems. The base station controllers 132, 142, 152 at each cell site 131–151, in response to control messages from the Mobile Telephone Switching Office 106, control the transmitter-receiver pairs at the cell site 131. The control processes at each cell site also control the tuning of the wireless subscriber devices to the selected radio frequencies. In the case of CDMA, the system also selects the PN code word to enhance isolation of the communications with the wireless subscriber devices.

Each cell in the cellular communication network comprises a predetermined volume of space radially arranged around the cell site transmitting antenna with the region of space roughly approximating a cylindrical volume having predetermined height. Since all of the wireless subscriber devices are installed in ground-based units (such as motor vehicles or handheld units) in traditional cellular communication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based wireless subscriber device initiates a call connection, control signals from the local cell site transmitter cause the frequency agile transponder in the ground-based wireless subscriber device to operate at the frequency of operation designated for that particular cell site. As the ground-based wireless subscriber device moves from one cell site to another, the call connection is handed off to the successive cell sites and the frequency agile transponder in the ground-based wireless subscriber device adjusts its frequency of operation to correspond to the frequency of operation of the transmitter located in the cell site in which the ground-based wireless subscriber device is presently operational.

There are numerous technologies that can be used to implement the cellular communication network and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access (CDMA) that uses orthogonal codes to implement communication channels, Time Division Multiple Access (TDMA) which uses time division multiplexing of a frequency to implement communication channels and Frequency Division Multiple Access (FDMA) which uses separate frequencies to implement communication channels, as well as combinations of these technologies. These concepts are well known in the field of cellular communications and various ones of these can be used to implement the ubiquitous wireless subscriber device of the present invention. These technologies are not limitations to the communique system which is described herein, since a novel system concept is disclosed, not a specific technologically limited implementation of an existing system concept.

The traditional CDMA cellular network architecture is designed to carry a wireless call between a wireless subscriber device and a base station, by simultaneously using multiple base stations or antennas to mitigate the effects of signal fading of various types, including, but not limited to: Raleigh, rician and log-normal. If one cell or one antenna in the CDMA cellular network has a poor signal for a given time frame, another cell or antenna in the CDMA cellular network which had an acceptable signal carries the call. This call management process is called soft or softer hand-off, depending on whether the call is carried between two cells or two antennas at a given cell, respectively.

Cellular Communication Network Architecture

FIG. 1 is the block diagram of the architecture of the present communique system for cellular communication networks 100 and one example of an existing commercial cellular communication network in which it is implemented. In the description of the present communique system for cellular communication networks, the major entities of the cellular communication network providing communique services to the wireless subscriber device 101 are the Base Station Subsystems 131–151 that are associated with the Mobile Telephone Switching Office 106. In a typical cellular communications network, there are numerous Mobile Telephone Switching Offices 106, but for the sake of simplicity only a single Mobile Telephone Switching Office is shown.

The typical implementation of an existing Mobile Telephone Switching Office 106 comprises a Mobile Telephone Switching Office Controller 106C which executes call processing associated with the Mobile Telephone Switching Office 106. A switching network 106N provides the telephone connectivity between Base Station Subsystems 131–151. Base Station Subsystems 131–151 communicate with wireless subscriber device 101 using Radio Frequency (RF) channels 111 and 112, respectively. RF channels 111 and 112 convey both command messages as well as digital data, which may represent voice signals being articulated at the wireless subscriber device 101 and the far-end party. With a CDMA system, the wireless subscriber device 101 communicates with at least One Base Station Subsystem 131. In FIG. 1, the wireless subscriber device 101 is simultaneously communicating with two Base Station Subsystems 131, 141, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base station subsystems may operate as the primary base station subsystem with respect to the other serving base station subsystems. Of course, a wireless subscriber device 101 may communicate with only a single base station subsystem if determined as sufficient by the cellular communication network.

Cellular communication networks provide a plurality of concurrently active communications in the same service area, with the number of concurrently active communication connections exceeding the number of available radio channels. This is accomplished by reusing the channels via the provision of multiple Base Station Subsystems 131–151 in the service area that is served by a single Mobile Telephone Switching Office 106. The overall service area of a Mobile Telephone Switching Office 106 is divided into a plurality of "cells", each of which includes a Base Station Subsystem 131 and associated radio transmission tower 102. The radius of the cell is basically the distance from the base station radio transmission tower 102 to the furthest locus at which good reception between the wireless subscriber device 101 and the radio transmission tower 102 can be effected. The entire service area of a Mobile Telephone Switching Office 106 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different radio frequencies and have different orthogonal coding. However, in the case of soft handoff, the frequencies must be the same for all cells involved in the soft or softer handoff process. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the subscriber stations 101 and the Base Station Subsystem 131. When a call is initiated, the control channel is used to communicate between the wireless subscriber device 101 involved in the call and the local serving Base Station Subsystem 131. The control messages locate and identify the wireless subscriber device 101, determine the dialed number, and identify an available voice/data communication channel consisting of a pair of radio frequencies and orthogonal coding which is selected by the Base Station Subsystem 131 for the communication connection. The radio unit in the wireless subscriber device 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this wireless subscriber device 101 to an adjacent cell, when the subscriber moves from the present cell to one of the adjoining cells. The transmitter power of the wireless subscriber device 101 is regulated since the magnitude of the signal received at the Base Station Subsystem 131 is a function of the subscriber station transmitter power and the distance from the Base Station Subsystem 131. Therefore, by scaling the transmitter power to correspond to the distance from the Base Station Subsystem 131, the received signal magnitude can be maintained within a predetermined range of values to ensure accurate signal reception without interfering with other transmissions in the cell.

The voice communications between wireless subscriber device 101 and other subscriber stations, such as land line based subscriber station 109, is effected by routing the communications received from the wireless subscriber device 101 via switching network 106N and trunks to the Public Switched Telephone Network (PSTN) 108 where the communications are routed to a Local Exchange Carrier 125 that serves land line based subscriber station 109. There are numerous Mobile Telephone Switching Offices 106 that are connected to the Public Switched Telephone Network (PSTN) 108 to thereby enable subscribers at both land line based subscriber stations and wireless subscriber devices to communicate between selected stations thereof. This architecture represents the present architecture of the wireless and wire line communication networks. The present communique system for cellular communication networks 100 is shown connected to the Public Switched Telephone Network 108, the Mobile Telephone Switching Offices 106, as well as a data communication network such as the Internet 107, although these examples of interconnections are subject to an implementation selected by the purveyor of communique services and some of these connections can be eliminated as unnecessary for some implementations as described below.

Format of the Forward CDMA Channel

FIG. 3 illustrates in block diagram form a typical configuration of the Base Station Subsystem 131 to wireless subscriber device 101 forward CDMA channel used in cellular communication networks. The typical Base Station Subsystem 131 to wireless subscriber device 101 forward CDMA channel comprises a predefined bandwidth centered about a selected carrier frequency. The bandwidth of the selected channel as well as the selected carrier frequency is a function of the technical implementation of the Base Station Subsystem 131 of the cellular communication network and is not discussed further herein. The channel is typically divided into a plurality of segments: Pilot 301, Synchronization (Synch) 302, Paging 303, Traffic 304. The Paging 303 and Traffic 304 segments are further divided into a plurality of channels Ch1–Ch7 and Ch1–Ch55, respectively. Each traffic channel represents a communication space for a selected wireless subscriber device 101. The plurality of paging channels Ch1–Ch7 are available for the base station subsystem 131 to page a selected wireless subscriber device 101 in well known fashion. In order to segregate these channels, each channel is assigned a selected one of the 64 Walsh codes, from W=0 to W=63. For example, the Pilot channel is assigned a Walsh code of W=0, while the Synch channel is assigned a Walsh code of W=32. The Paging channels Ch1–Ch7 are assigned Walsh codes of W=1–W=7, respectively. The remaining Walsh codes are assigned to the traffic channels CH1–CH55 as shown in FIG. 3. Each Traffic channel consists of data traffic 311 as well as in band signaling 312 transmitted from the base station subsystem 131 to the wireless subscriber device 101.

Idle Handoff of Wireless Subscriber Devices

FIG. 2 illustrates in flow diagram form the operation of a typical cellular communication system in implementing an idle handoff mode of operation. An idle handoff occurs when a wireless subscriber device 101 has moved from the coverage area of one Base Station Subsystem 131 into the coverage area of another Base Station Subsystem 141 during the Wireless Station Idle State. As shown in FIG. 2, at step 201, the wireless subscriber device 101 scans for pilot signals for the base stations that serve the coverage area in which the wireless subscriber device 101 is operational. If the wireless subscriber device 101 detects a Pilot channel signal from another base station subsystem 141, that is sufficiently stronger than that of the present Base Station Subsystem 131, the wireless subscriber device 101 determines that an idle handoff should occur. Pilot channels are identified by their offsets relative to the zero offset pilot PN sequence and typically are the Walsh Code 0 for each channel. Pilot offsets are grouped by the wireless subscriber device 101 at step 202 into sets describing their status with regard to pilot searching. The following sets of pilot offsets are defined for a wireless subscriber device 101 in the Wireless Station Idle State. Each pilot offset is a member of only one set.

Active Set: The pilot offset of the Forward CDMA Channel whose Paging channel is being monitored.

Neighbor Set: The offsets of the Pilot channels that are likely candidates for idle handoff. The members of the Neighbor Set are specified in the Neighbor List Message, Extended Neighbor List Message, and the General Neighbor List Message.

Remaining Set: The set of all possible pilot offsets.

In the process of FIG. 2, the wireless subscriber device 101 at step 203 selects the 3 strongest pilot signals for use in establishing/maintaining the cellular communication connection. In this process, the RAKE receiver in the wireless subscriber device 101 at step 207 continuously looks for the strongest pilot signals to ensure the continuation of the cellular communication connection. The wireless subscriber device 101 at step 204 decodes the pilot signals and locks on to the synch channel of selected forward CDMA channels having the strongest pilot signals.

At step 205, the wireless subscriber device 101 transmits on the Access channel of the end user to base station reverse CDMA channels, corresponding to of the selected forward CDMA channels having the strongest pilot signals, using a random access procedure. Many parameters of the random access procedure are supplied by the Base Station Subsystem 131 in the Access Parameters Message. The entire process of sending one message and receiving (or failing to receive) an acknowledgment for that message is called an access attempt. One access attempt consists of one or more access sub-attempts. Each transmission in the access sub-attempt is called an access probe. Each access probe consists of an Access channel preamble and an Access channel message capsule.

When the wireless subscriber device 101 stops transmitting access probes of an access attempt to one pilot and begins transmitting access probes of an access attempt to another pilot, it is said to perform an access probe handoff. The portion of an access attempt which begins when the wireless subscriber device 101 begins transmitting access probes to one pilot, and ends when the wireless subscriber device 101 either performs an access probe handoff or receives an acknowledgment for that message is called an access sub-attempt. When the access probe handoff is successful, at step 205 the wireless subscriber device 101 switches to idle Traffic channels, one per selected forward CDMA channel and demodulates the signals received therein and at step 206 outputs the demodulated multi-media output to the user interface of the wireless subscriber device 101 for use by the subscriber.

As described herein, the overhead required in point to point cellular communications to manage hand-offs between cells within the cellular communication network is considerable and continuous, since many of the wireless subscriber devices served by the cellular communication network are mobile in nature. In the present communique system for cellular communication networks, the need for this overhead in processing call hand-offs is reduced since the wireless subscriber device is not provided with a unique communication link, but shares this link with many other wireless subscriber devices. There are a number of communique implementations that can be overlaid on this standard hand-off process.

Within an access sub-attempt, access probes are grouped into access probe sequences. The Access channel used for each access probe sequence is chosen pseudo randomly from among all the Access channels associated with the present Paging channel. If there is only one Access channel associated with the present paging channel, all access probes within an access probe sequence are transmitted on the same Access channel. If there is more than one access channel associated with the present Paging Channel, all access probes within an access probe sequence may be transmitted on the different Access channels associated with the present Paging channel. Each access probe sequence consists of up to 1+NUM_STEPs access probes. The first access probe of each access probe sequence is transmitted at a specified power level relative to the nominal open loop power level. Each subsequent access probe is transmitted at a power level that is adjusted by the PWR_STEPs plus the mean input power change plus the interference correction change from the previous access probe.

The timing of access probes and access probe sequences is expressed in terms of Access channel slots. The transmission of an access probe begins at the start of an Access channel slot. There are two types of messages sent on the Access channel: a response message (one that is a response to a base station message) or a request message (one that is sent autonomously by the wireless subscriber device). Different procedures are used for sending a response message and for sending a request message. The timing of the start of each access probe sequence is determined pseudo randomly. Timing between access probes of an access probe sequence is also generated pseudo randomly. After transmitting each access probe, the wireless subscriber device waits a specified period, $TA=(2+ACC\_TMO_s) \times 80$ ms, from the end of the slot to receive an acknowledgment from the base station. If an acknowledgment is received, the access attempt ends. If no acknowledgment is received and the wireless subscriber device transmits all access probes within an access probe sequence on the same Access channel associated with the current Paging channel, the next access probe is transmitted after an additional back off delay, RT, from 0 to 1+PROBE_BKOFF$_s$ slots. If no acknowledgment is received and the wireless subscriber device pseudo randomly selects an Access channel from among all Access channels associated with the current Paging channel, the next access probe is transmitted after an additional back off delay, RT, from 0 to PROBE_BKOFF$_s$ slots. The wireless subscriber device 101 shall not begin a new access attempt until the previous access attempt has ended.

Access Handoff

The wireless subscriber device 101 is permitted to perform an access handoff to use the Paging channel with the best pilot strength and an associated Access channel. The wireless subscriber device 101 is permitted to perform an access handoff when waiting for a response from the Base Station Subsystem 131 or before sending a response to the Base Station Subsystem 131. An access handoff is permitted after an access attempt while the wireless subscriber device 101 is in the Page Response Subrate or the Wireless Station Origination Attempt Subrate. When the wireless subscriber device 101 declares a loss of the Paging channel, the wireless subscriber device 101 shall perform an access handoff while waiting for a response from the Base Station Subsystem 131 in the System Access State if the wireless subscriber device 101 is not performing an access attempt and all of the following conditions hold:

The new base station is in the list ACCESS_HO_LIST, ACCESS_HOs is equal to '1', and The wireless subscriber device is in the Page Response Subrate or the Wireless Station Origination Attempt Subrate.

When the wireless subscriber device 101 declares a loss of the Paging channel, the wireless subscriber device 101 shall perform an access handoff after receiving a message and before responding to that message while in the System Access State if the wireless subscriber device 101 is not performing an access attempt and all of the following conditions hold:

The new base station is in the list ACCESS_HO_LIST, ACCESS_HOs is equal to '1',

ACCESS_HO_MSG_RSPs is equal to '1', and

The wireless subscriber device is in the Page Response Subrate or the Wireless Station Origination Attempt Subrate.

When the wireless subscriber device 101 declares an insufficiency of the Paging channel, the wireless subscriber device 101 may perform an access handoff while waiting for a response from the Base Station Subsystem 131 in the System Access State if the wireless subscriber device 101 is not performing an access attempt and all of the following conditions hold:

The new base station is in the list ACCESS_HO_LIST,
ACCESS_HOs is equal to '1', and
The wireless subscriber device is in the Page Response Subrate or the Wireless Station Origination Attempt Subrate.

When the wireless subscriber device 101 declares an insufficiency of the Paging channel, the wireless subscriber device 101 may perform an access handoff after receiving a message and before responding to that message while in the System Access State if the wireless subscriber device 101 is not performing an access attempt and all of the following conditions hold:

The new base station is in the list ACCESS_HO_LIST,
ACCESS_HOs is equal to '1',
ACCESS_HO_MSG_RSPs is equal to '1', and
The wireless subscriber device is in the Page Response Subrate or the Wireless Station Origination Attempt Subrate.

Before the wireless subscriber device 101 transmits an access probe to the new Base Station Subsystem 141, the wireless subscriber device 101 shall update the parameters based on the System Parameters Message, the Access Parameters Message and the Extended System Parameters Message on the associated new Paging channel and process the parameters from the messages. The wireless subscriber device 101 shall update the parameters based on the Neighbor List Message, Extended Neighbor List Message or the General Neighbor List Message on the associated new Paging channel and process the parameters from the message. If the wireless subscriber device 101 receives a Global Service Redirection Message which directs the wireless subscriber device 101 away from the new Base Station Subsystem 141, the wireless subscriber device 101 shall not access the new Base Station Subsystem 141. The wireless subscriber device 101 shall process these messages only once after each access handoff. If ACCESS_PROBE_HO$_s$ is equal to '0' and ACCESS_HO$_s$ is equal to '1', the wireless station may monitor other Paging Channels which are in ACCESS_HO_LIST for $T_{42m}$ seconds after the wireless subscriber device 101 declares a loss of the original Paging channel during an access attempt.

Access Probe Handoff

The wireless subscriber device 101 is permitted to perform an access probe handoff when the wireless subscriber device 101 is in the Page Response Subrate or the Wireless Station Origination Attempt Subrate. The wireless subscriber device 101 may perform an access probe handoff during an access attempt to a pilot in ACCESS_HO_LIST when the message being sent is the Origination Message or the Page Response Message if all of the following conditions hold:

ACCESS_PROBE_HOs is equal to '1',
The wireless subscriber device is in the Page Response Subrate or the Wireless Station Origination Attempt Subrate, and
The wireless subscriber device has performed fewer than (MAX_NUM_PROBE_HOs+1) access probe hand-offs during the current access attempt.

The wireless subscriber device 101 may also perform an access probe handoff during an access attempt to a pilot in ACCESS_HO_LIST when the message being sent is a message other than the Origination Message or the Page Response Message if all of the preceding conditions hold and ACC_PROBE_HO_OTHER_MSGs is equal to '1'.

The wireless subscriber device 101 may also perform an access probe handoff during an access attempt to a pilot not in ACCESS_HO_LIST when the message being sent is the Origination Message or the Page Response Message if all of the following conditions hold:

ACC_HO_LIST_UPDs is equal to '1',
ACCESS_PROBE_HOs is equal to '1',
The new pilot is stronger than any pilot in ACCESS_HO_LIST,
The new pilot has the corresponding ACCESS_HO_ALLOWED field in the NGHBR_REC equal to '1',
Inclusion of the new pilot in ACCESS_HO_LIST does not cause the Access channel message to exceed the maximum capsule size,
Inclusion of the new pilot in ACCESS_HO_LIST does not cause the number of members to exceed $N_{13m}$,
The wireless subscriber device is in the Page Response Subrate or the Wireless Station Origination Attempt Subrate, and
The wireless subscriber device has performed fewer than (MAX_NUM_PROBE_HOs+1) access probe hand-offs during the current access attempt.

The wireless subscriber device 101 may also perform an access probe handoff during an access attempt to a pilot in ACCESS_HO_LIST when the message being sent is a message other than the Origination Message or the Page Response Message if all of the preceding conditions hold and ACC_PROBE_HO_OTHER_MSGs is equal to '1'. If the above conditions are met, the wireless subscriber device 101 may perform an access probe handoff when the wireless subscriber device 101 declares a loss of the Paging channel; the wireless subscriber device 101 may also perform an access probe handoff after the TA timer expires and the wireless subscriber device 101 declares an insufficiency of the Paging channel.

Before the wireless subscriber device 101 transmits an access probe to the new base station 104, the wireless subscriber device 101 shall update the parameters based on the System Parameters Message, the Access Parameters Message and the Extended System Parameters Message on the associated new Paging channel and process the parameters from the message. The wireless subscriber device 101 shall update the parameters based on the Neighbor List Message, Extended Neighbor List Message, or the General Neighbor List Message on the associated new Paging channel and process the parameters from the message. If the wireless subscriber device 101 receives a Global Service Redirection Message which directs the wireless subscriber device 101 away from the new Base Station Subsystem 141, the wireless subscriber device 101 shall not access the New Base Station Subsystem 141. The wireless subscriber device 101 shall process these messages only once per access sub-attempt during an access attempt.

If the wireless subscriber device 101 performs an access probe handoff, the wireless subscriber device 101 shall restart the access attempt probe sequence number on the new pilot, starting with the first probe of the first probe sequence of the access sub-attempt. The wireless subscriber device 101 shall not reset its access probe handoff count until the access attempt ends. The wireless subscriber device 101 shall abort the access attempt if the length of the message to be sent exceeds MAX_CAP_SIZE of the new base station. The wireless subscriber device 101 may monitor other Paging channels which are in ACCESS_HO_LIST for $T_{42m}$ seconds.

Philosophy of the Communique System

The terms "cell site" and "cell" are sometimes loosely used in the literature, and the term "cell site" generally denotes the locus, such as Base Station Subsystem 131, at which the radio frequency transmitter and receiver apparatus (Base Station Transceiver 133, 143, 144, 153) is located, while the term "cell" generally denotes the region of space which is served by a particular radio frequency transmitter-receiver pair which is installed in Base Station Transceiver 133 at Base Station Subsystem 131, and includes sectors of a particular cell where the cell comprises a plurality of sectors. The particular technology used to implement the communications between wireless subscriber devices and the radio frequency transmitter-receiver pairs as well as the nature of the data transferred there between, be it voice, video, telemetry, computer data, and the like, are not limitations to the communique system for cellular communication networks 100 which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated radio frequency transmitter-receiver pairs located at the cell site for each of these cells. In addition, the term "telecommunications cell" is used in the general sense and includes a traditional cell generated by a cell site as well as a sector of a cell, as well as a cell elevation sector, regardless of size and shape. The wireless subscriber device, as noted above, can be any of a number of full function communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device. The subscriber terminal devices can either be mobile wireless communication devices in the traditional mobile subscriber paradigm, or the fixed wireless communication devices in the more recent wireless product offerings.

The communique system for cellular communication networks operates with existing cellular communication networks, as described above, to provide other than strictly point to point communication services, which are collectively termed "communique services" herein, to subscribers. The Communique can be unidirectional (broadcast) or bidirectional (interactive) in nature and the extent of the Communique can be network-wide or narrowcast, where one or more cells and/or cell sectors are grouped to cover a predetermined geographic area or demographic population or subscriber interest group to transmit information to subscribers who populate the target audience for the narrowcast transmissions. For instance, the coverage region can be implemented in the radio frequency domain by using frequency assignments, code assignments or dynamically shaped antenna patterns. Pattern shaping is done now to manage capacity constraint issues (e.g. a cell size would be shaped/shrunk at busy hour with adjacent cells helping to carry a particular region's traffic). The communique system for cellular communication networks can use pattern shaping to create a narrowcast region, for instance, or other such communication coverage methods.

The communique system for cellular communication networks creates broadcast and/or narrowcast regions in a "virtual" manner. With this concept, the RF configuration is separable, in that it can be static in its architecture OR it could be configured as described above in a dynamic manner. The "virtual" architecture is achieved in the content domain—a very powerful and flexible concept. By selectively enabling and disabling specific content on a cell-by-cell basis, a shaped broadcast or narrowcast can be realized from the end-user's perspective even though the RF configuration may have remained static or unchanged. This is a powerful narrowcast tool since it is relatively simple to dynamically change the specific content being transmitted at a given cell. The combinatorial effect is spatial and temporal in its extent even though the RF architecture may have been unchanged. The methods available to achieve this effect are similar to the zip code advertising systems used in cable TV transmissions wherein regional servers select, parse and reassemble content for a particular geographic region. The content management can also be done on a centralized basis.

Communique Content Selection via Subscriber Profiles

Figure 15:
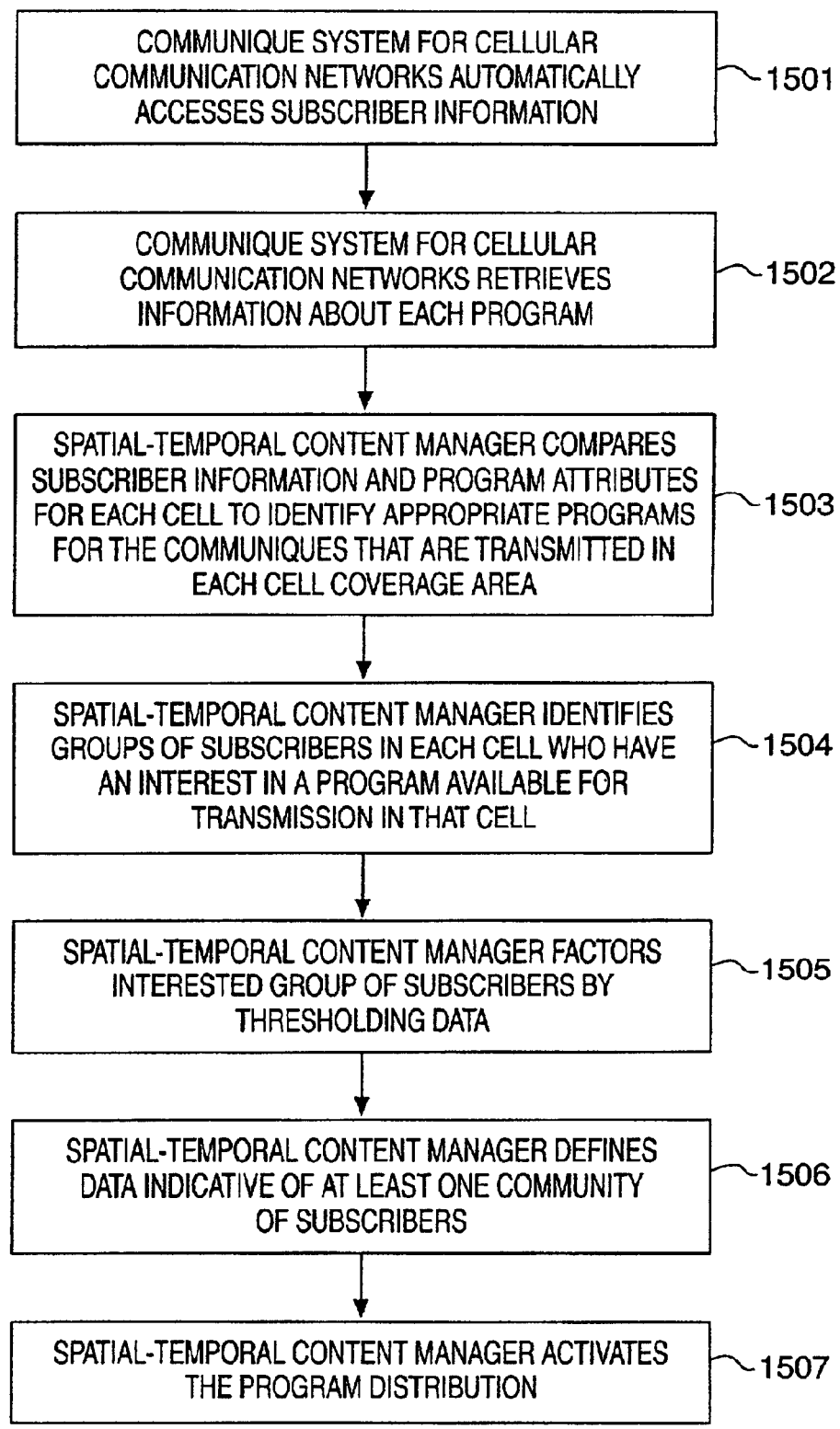
FIG. 15 illustrates in flow diagram form one mode of using subscriber information as active feedback in the operation of the present communique system for cellular communication networks.

FIG. 15 illustrates in flow diagram form one mode of using subscriber information as active feedback in the operation of the present communique system for cellular communication networks. The communique system for cellular communication networks 100 can dynamically and automatically manage both the content of the narrowcasts and the scope of coverage of the narrowcasts by use of subscriber information.

This is accomplished where the communique system for cellular communication networks 100 at step 1501 automatically accesses the subscriber's authorization and service plans, as well as (optionally) the subscriber profiles for the subscribers, which for simplicity are termed "subscriber information" herein, for each subscriber in a given cell, which subscriber profile describes the subscriber's interest level, and/or subscription to various types of programs. This subscriber information, as noted above, can be stored, for example, as part of the subscriber-specific record in the Communique Location Register 163.

The Spatial-Temporal Content Manager 114 of the communique system for cellular communication networks 100 retrieves from its memory and/or retrieves from another source, such as the program source, one or more pieces of information about each program at step 1502. These pieces of information are termed "attributes" which can be data in any form and format, which can also be decomposed into a numeric measure, which numeric measure is associated with a content parameter. This means that any set of attributes can be replaced by a set of numeric measures, and hence any profile can be represented as a vector of numbers denoting the values of these numeric measures for each content parameter. In this manner, the program is numerically quantified based upon a number of predetermined parameters or program characteristics. Relevance feedback can also be used herein as part of the subscriber information, since it determines the subscriber's interest in certain programs: namely, the programs that the subscriber has actually had the opportunity to evaluate (whether actively or passively). For programs of a type that the subscriber has not yet seen, a content filtering system must estimate the likelihood of a subscriber's interest in the program. This estimation task is the heart of the filtering problem, and the reason that the similarity measurement is important.

The evaluation of the likelihood of interest in a particular program for a specific subscriber can automatically be computed by the Spatial-Temporal Content Manager 114 on a dynamic basis. The communique system for cellular communication networks 100 uses the Spatial-Temporal Content Manager 114 to evaluate a given set of available programs against the subscriber information for the subscribers who are active within each cell site coverage area to identify whether any of the presently available programs are of interest to these subscribers so that the subscribers can be advised of relevant programs, which are automatically selected by the communique system for cellular communication networks for transmission to selected cells. Each subscriber is advised of the availability of the program transmitted in their cell that closely matches the subscriber's interests as described by the subscriber's information in the Communique Location Register 163. Subscriber's information are automatically updated on a continuing basis to reflect each subscriber's changing interests.

The use of this information to dynamically alter the content of Communiques and the communique coverage area can be effected in several modes. The typical mode is where programs are available from the program sources and the communique system for cellular communication networks 100 must determine the appropriate community of subscribers, if any, for each or at least a plurality of these programs. This is a "push" mode of program delivery, where the programs are migrated to the determined communities of subscribers. An alternative mode of delivery of programs is the "pull" mode, where the subscribers request access to programs and the communique system for cellular communication networks 100 creates communique coverage areas to deliver the requested programs to the subscribers. The former case is used as an example herein, since it is the typical mode of program delivery.

The subscriber information and program attributes are compared by the Spatial-Temporal Content Manager 114 at step 1503 for each cell in order to identify appropriate programs for the Communiques that are transmitted in each cell coverage area. Thus, subscriber clustering can be used on the basis of subscribers active in each cell, which clustering data is correlated with the program available for narrowcast in the cell. This results at step 1504 in the identification of groups of subscribers in each cell who have an interest in a program available for transmission in that cell. This interested group of subscribers can also be factored at step 1505 by thresholding data, such as: number of said identified subscribers entering into and moving out of a cell of the cellular communication network, number of subscribers active in a cell of the cellular communication network, services requested by identified subscribers active in a cell of the cellular communication network, density of subscribers active in the cellular communication network. These factors can be used to modify the program selection based on subscriber population and activity so that bandwidth is not expended to serve a minimal number of subscribers in any particular cell. The result of these computations is that the Spatial-Temporal Content Manager 114 at step 1506 defines data indicative of at least one community of subscribers, with each of the communities of subscribers comprising a plurality of subscribers who are active in at least one cell of the cellular communication network and who have an interest in an identified program. This community data therefore is used at step 1507 to activate the program distribution as described herein to create a narrowcast coverage area which transmits a selected program via at least one cell to an identified population of subscribers who are active in the identified cells.

Dynamic Bandwidth Allocation

The basic functionality of the communique system for cellular communication networks 100 comprises an information distribution management functionality that concurrently propagates information to a plurality of wireless subscriber devices, using push, pull and combinations of push/pull data propagation modes. The need for information dissemination is identified: in response to external events, in response to predetermined temporal/spatial stimuli; as a function of subscriber inquiries/requests; and the like, as described above. The communique system for cellular communication networks 100, in response to an identified information dissemination event or need, identifies a plurality of cells in the cellular communication network as well as available communication channels in each of these cells to carry the information that is to be transmitted to a plurality of wireless subscriber devices extant in the locales served by the selected cells. The communication channels must carry both control information as well as content. The communication channels can be dedicated to communique services or can be selected from the pool of available communication channels. The subscribers access the Communiques by selecting the communication channel on their wireless subscriber device that carries the Communique. The subscriber can be alerted to the presence of the Communique in many ways or can activate their wireless subscriber device to retrieve the Communique absent any alert being transmitted to the wireless subscriber device. The Communique retrieved by the subscriber is not subscriber-unique, in that the Communique is transmitted to many subscribers, with a plurality of subscribers concurrently accessing the Communique being a typical mode of operation. In addition, the bandwidth required for communique services can be variable, with unused channels of the existing cellular communication network being allocated on an as needed basis to communique services. Furthermore, the routine point to point cellular communication traffic can be load balanced with the communique services, with routine cellular traffic being preferentially served by cells that have unused capacity to thereby free up channels in other cells for communique services.

In addition, the communique system for cellular communication networks 100 identifies the appropriate source of information available from a program source which is to be used to constitute the communique service. The information can be a predetermined continuous feed, or can be comprised of a plurality of segments which can be interspersed with advertisements, other information segments and the like.

Figure 16A:
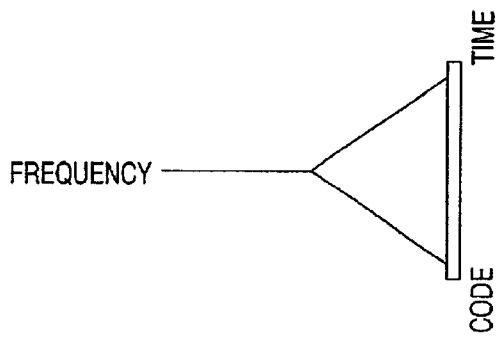
FIGS. 16A, 16B illustrate an example of dynamic bandwidth allocation that can simultaneously occur in multiple domains: time, code, frequency.
Figure 16B:
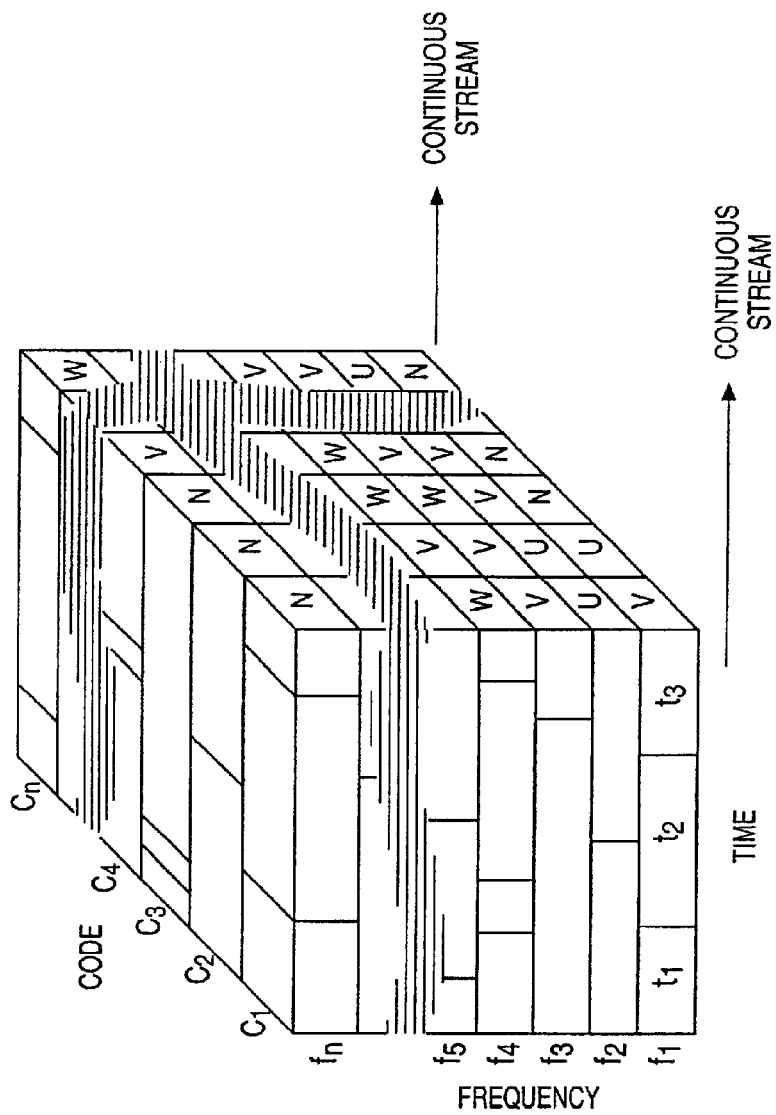

The communique system for cellular communication networks can dynamically allocate the available bandwidth as noted above to thereby serve subscribers with more control channel(s) and/or control channel bandwidth and/or communication channels and/or communication channels of greater bandwidth as the need presents itself. The dynamic bandwidth allocation can simultaneously occur in multiple domains: time, code, frequency to thereby serve the needs of the subscribers to receive Communiques. FIGS. 16A, 16B illustrates an example of dynamic bandwidth allocation that can simultaneously occur in multiple domains: time, code, frequency. The communique system for cellular communication networks can manage the bandwidth available for communique services by parsing the available communication space. In the diagram of the multidimensional communication space of FIG. 16B, the total communication capacity at any point in time is represented by the right-hand face of the block, where the channels available for communication are divided in the code domain and the frequency domain. Another view of the multidimensional communication space is that the volume of information that can be delivered is represented by the entirety of the block, where the channels available for communication are divided in the time domain, the code domain and the frequency domain. Thus, this communication space can, for example, carry both circuit switched voice V or data W (such as Wireless Internet) as well as communiques N. For example, the segment on the top face of the block that represents the coordinates C3, fn, and part of t1 is a small block of data and can be used for transmitting control information to the wireless subscriber device 101, while the following segment for the same coordinates, spanning times t1, t2, t3 represents a large block of communication channel capacity and can be communique program content N or voice/data V.

The available communication space can be managed in a fixed manner with selected frequencies and/or codes being reserved for voice/data communications V/W while selected frequencies and/or codes being reserved for communique services N. Another option is that a third set of frequencies and/or codes U are not reserved, but are available for use by circuit switched voice/data and communique services on demand. Thus, circuit switched voice/data communications can coexist with communique services. This architecture also lends itself to dynamic switching among the communication channels, such as switching from frequency f2 in code space C1 to frequency f5 in code space C1 during time slot t2. The subscriber program content can therefore be transmitted on selected channels with the wireless subscriber device 101 switching frequency and/or code to access the desired program content.

Communique Services in Cellular Communication Networks

As can be seen from the above description, the wireless subscriber device 101 listens for the strongest pilot signal in one of the available communication channels and uses this pilot signal to derive a time/frequency reference. The wireless subscriber device 101 then demodulates the synch signal for this communication channel to precisely align the clock of the wireless subscriber device 101 with that contained in the Base Station Subsystem 131. For a broadcast mode of operation, the wireless subscriber device 101 must be given information that identifies which PN codes are broadcast/narrowcast signals fort his communication channel. This can be accomplished by transmitting directory information to the wireless subscriber device 101 in the pilot or synch signals or by using a predefined PN code for selected broadcast signals.

Since the cellular communication network continuously transmits the Communique signals from various cell sites, there is no statistical reduction of self interference. Therefore, proper selection of frequencies for transmission and PN codes are necessary to reduce interference. Each PN code space can contain either a single transmission or can be used in a multiplex mode where multiple signals are transmitted. In the latter mode, time slotted baseband data is streamed on a single CDMA waveform by the creation of multiple subchannels in each frame of the transmission. In this manner, lower data rate signals can share a single transmission.

The Mobile Telephone Switching Office 106, in conjunction with the VLR and HLR, helps to manage the registration process which includes subscriber authorization. The Visitor Location Register 161 and the Home Location Register 162 are essentially sophisticated databases that are hooked to the Mobile Telephone Switching Office 106. The VLR and HLR are sometimes the same device with logical functional partitions although VLRs can stand alone and be distributed in their deployment while HLRs are typically more centralized. The Communique Location Register (CLR) 163, is the apparatus in the communique system for cellular communication networks 100 where all of the systems information for subscribers' authorization and service plans reside. This has substantial merit in terms of practical implementation since it can be a wholly separate device that connects to the Mobile Telephone Switching Office 106 or as an integral part of the communique system for cellular communication networks 100. The Communique Location Register 163 is attached to the Mobile Telephone Switching Office 106 in a manner similar to the HLR/VLR.

In order to describe the various services that are available from the communique system for cellular communication networks 100, the terms used to describe the processes operational in the recognition of a subscriber and provision of service to a subscriber must be defined. "Acquisition" is the process where the wireless subscriber device scans for pilots, locks onto synch channels and has all system based knowledge necessary to know where and how to receive Communiques. "Registration" is the process that entails the interchange of information between the wireless subscriber device and the cellular communication network wherein the cellular communication network becomes aware of and knows which subscribers are receiving Communiques and where they are receiving them. "Authorization" is the process where the communique system for cellular communication networks 100 grants end-user access to broadcast or narrowcast content to one or many subscribers in a general or specific location.

Thus, a "free" communique service has the ACQUISITION process but does not have REGISTRATION or AUTHORIZATION processes. "Subscription" communique services have all three processes. "Pre-pay" communique services have a modified ACQUISITION process but do not include REGISTRATION or AUTHORIZATION processes. Therefore, the term "autonomous" can be used to describe the "free" broadcast architecture, since the cellular communication network does not know who is listening or where they are listening. This is the equivalent of today's broadcast radio and TV with the exception that the content can be specialized into "free" narrowcasts that have a limited spatial extent which can be dynamically managed. The wireless subscriber device used for such a communique service can be a one-way receive only (ultra-low cost) wireless subscriber device.

For a communique service that includes free broadcasts and subscription services, the wireless subscriber device is not content interactive, meaning communique services such as request-reply are not available. The wireless subscriber device is two-way in terms of its communication capability with the network for registration and authorization purposes. A Pre-pay Subscription communique service is conceptually similar to the digital TV recorders that have a one-time-only pre-pay subscription fee. This concept uses a modified forward paging channel to provide initialization information for traffic channels and then uses in-band signaling on the forward traffic channel to convey systems information.

Unidirectional Transmission without Subscriber Registration

There are numerous possible architectures that can be used to transmit information to the wireless subscriber devices with the architecture selected having an impact on the types of transmissions.

FIG. 4 illustrates in block diagram form a typical assignment of cells in a cellular communication network for a unidirectional transmission without subscriber registration mode of operation of the present communique system for cellular communication networks 100, where a plurality of cells are transmitting communique signals, with each cell using the same frequency and optionally the same Walsh (PN) code for a selected Communique. There is a K=3 cell repeat pattern, although alternatively, the cells can be subdivided into three sectors for the same effect. In this manner, the wireless subscriber device 101 does not have to search for the desired Communique, since the location is uniform throughout the cellular communication network. The wireless subscriber device 101 is always in soft handoff mode and in the example of FIG. 4, the PN code varies by cell according to the K=3 repeat pattern, so the wireless subscriber device 101 maintains a soft handoff mode with the three PN codes, regardless of the location of the wireless subscriber device 101 in the cellular communication network. Existing wireless subscriber devices are equipped with three receivers in the rake receiver system which enables operation in this mode.

Figure 6:
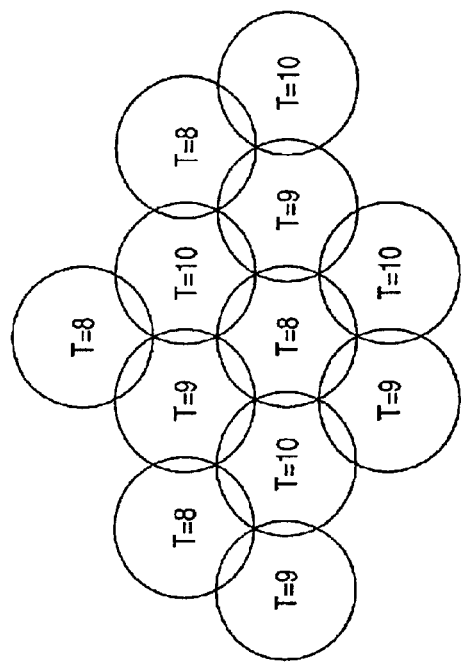
FIG. 6 illustrates in block diagram form a typical assignment of cells in a cellular communication network as an example of the operation of the present communique system for cellular communication networks.

Alternatively, adjacent cells (or cell sectors) can transmit the Communique signals on different frequencies, but this requires additional complexity in the wireless subscriber device, since the handoff must occur with both frequency and PN code making it a hard handoff. In addition, the lack of uniformity in the transmission frequency requires the wireless subscriber device to receive information from the base station to identify the location of the desired Communique in order to enable the wireless subscriber device to lock on to the appropriate combination of frequency and PN code for each cell. One way of avoiding the complexity is illustrated in FIG. 6 where there is a grouping of K=3 for the cells and the Walsh code assignment is static, using a specific Walsh code for each of the K=3 cells, such as Traffic channel 8 (Walsh code W=8) for the cell K=1 and Traffic channel Ch9 (Walsh code W=9) for the cell K=2 and Traffic channel Ch10 (Walsh code W=10) for cell K=3. Therefore, the subscriber does not need additional information from the cellular communication network to receive the broadcast information, since the wireless subscriber device 101 has 3 RAKE receivers, which can each be locked on to one of the three Walsh codes W=8–W=10 used in the K=3 repeat scenario. The wireless subscriber device 101 can always be in a soft handoff mode to ensure that continual reception of the transmission takes place as the wireless subscriber device 101 receives signals from the three predetermined Traffic channels.

Non-Interactive Bidirectional Transmission with Subscriber Registration

Figure 7:
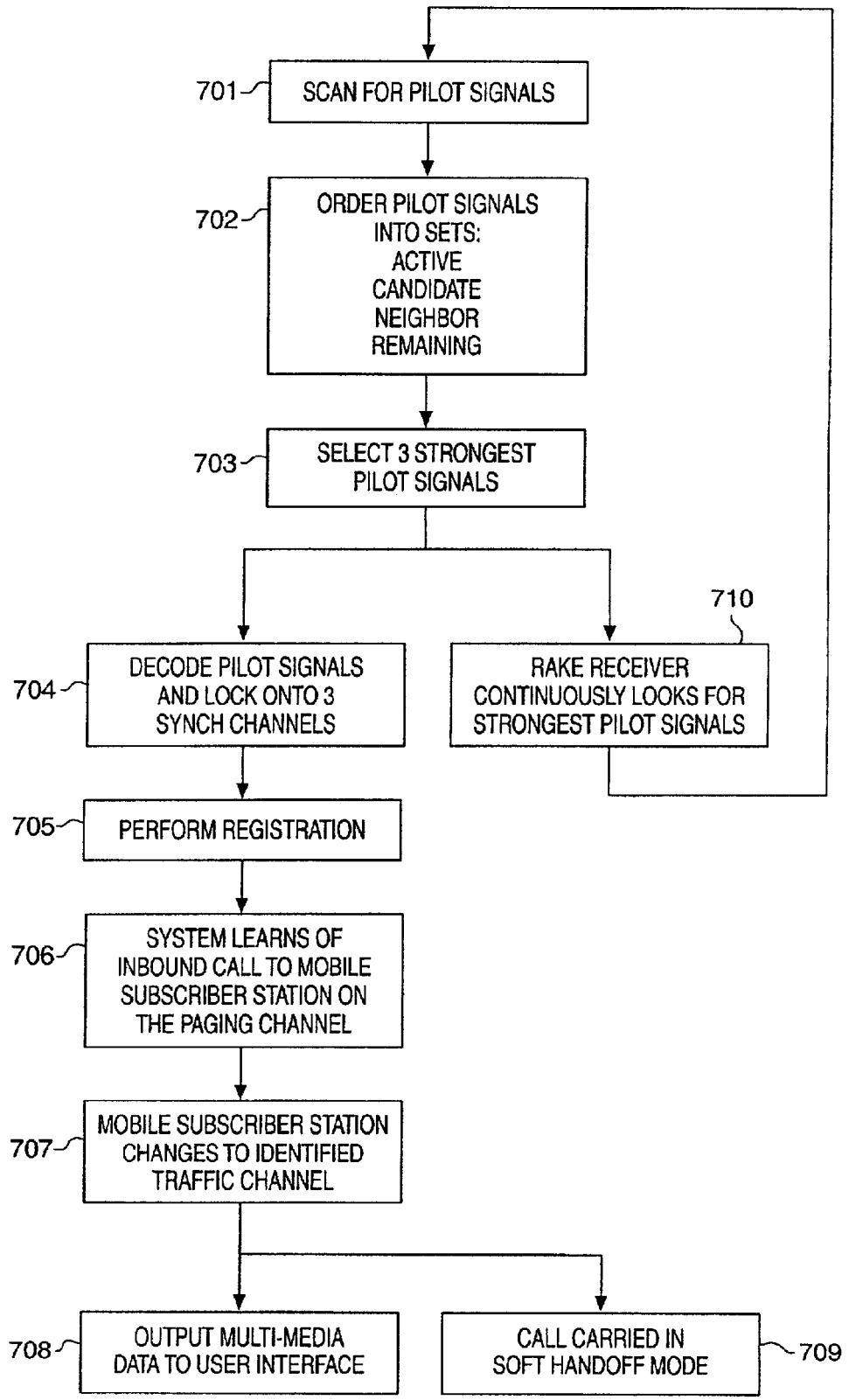
FIG. 7 illustrates in block diagram form a typical assignment of cells in a cellular communication network for a non-interactive bidirectional transmission with subscriber registration mode of operation of the present communique system for cellular communication networks.

FIG. 7 illustrates in block diagram form a typical assignment of cells in a cellular communication network for a non-interactive bidirectional transmission with subscriber registration mode of operation of the present communique system for cellular communication networks 100, where a plurality of cells are transmitting Communique signals, with each cell using any frequency and any Walsh (PN) code for a selected Communique. This mode of operation enables the cellular communication system to select any repeat pattern of cells, any assignment of Walsh codes for a transmission to thereby enable communique services. The wireless subscriber device 101 communicates with the Base Station Subsystem 131 for channel assignment spoofed registration purposes to receive free communique services, but does not enter an interactive mode once registration is accomplished. Thus, the wireless subscriber device 101 does not require a unique MIN for this free communique services mode of operation, since billing or authorization are not required.

However, for subscription services, as shown in FIG. 7, at step 701, the wireless subscriber device 101 scans for pilot signals from the Base Station Subsystems that serve the coverage area in which the wireless subscriber device 101 is operational. If the wireless subscriber device 101 detects a Pilot Channel signal from another Base Station Subsystem 141, that is sufficiently stronger than that of the present Base Station Subsystem 131, the wireless subscriber device 101 determines that an idle handoff should occur. Pilot Channels are identified by their offsets relative to the zero offset pilot PN sequence and typically are the Walsh Code 0 for each channel. Pilot offsets are grouped by the wireless subscriber device 101 at step 702 into sets describing their status with regard to pilot searching. The wireless subscriber device 101 at step 703 selects the 3 strongest pilot signals for use in establishing/maintaining the cellular communication connection. In this process, the RAKE receiver in the wireless subscriber device 101 at step 710 continuously looks for the strongest pilot signals to ensure the continuation of the cellular communication connection. The wireless subscriber device 101 at step 704 decodes the pilot signals and locks on to the synch channel of the 3 selected forward CDMA channels having the strongest pilot signals.

At step 705, the wireless subscriber device 101 registers with the Base Station Subsystem 131 using their unique EIN and SSD, but a common MIN that is used for communique purposes to spoof the base station subsystem 131 into recognizing the wireless subscriber device 101 without requiring a unique identity for the wireless subscriber device 101. In addition, the fraud prevention system (software) in the Mobile Telephone Switching Office 106 is disabled for Communiques since the fraud system rejects multiple simultaneous MINs at different geographic locations. This feature is designed to prevent cloning fraud (more of an artifact for analog versus digital) although multi-MIN fraud detection is used in digital systems as well. The Base Station Subsystem 131 verifies the authorization of this wireless subscriber device 101 to receive the requested service, identifies the inbound call to the wireless subscriber device 101 (shared by potentially many wireless subscriber devices) at step 706 via the Paging channel used by the wireless subscriber device 101 to request this service and, in response to control signals received by the wireless subscriber device 101 from the Base Station Subsystem 131, the wireless subscriber device 101 at step 707 changes to the identified traffic channel that carries the selected Communique. The wireless subscriber device 101 at step 709 remains in a soft handoff mode to ensure uninterrupted reception of the Communique and also at step 708 outputs the received multi-media data to the user.

In this scenario, the issue of "push/pull" transmissions was not mentioned. The subscriber at wireless subscriber device 101 can receive "push" data transmissions from a source which are directed to all subscribers of this service by the base station flood paging the MIN associated with this Communique. Thus, the wireless subscriber device 101 would potentially have multiple MINs, with one for point to point traditional cellular communications and one for each of the communique services to which the subscriber enrolls. Thus, when the wireless subscriber device 101 is active in the service area, the flood page of one of the subscriber's MINs on the paging channel alerts the subscriber of the presence of a Communique transmission. The subscriber can activate wireless subscriber device 101 to receive this transmission or can reject the transmission by operating appropriate buttons on the wireless subscriber device 101. The reverse path on this communique channel is disabled, since there are many subscribers simultaneously registering for the Communique. The Mobile Telephone Switching Office 106, Base Station Controller (BSC) 132, 142, 152 and Base Station Transceiver (BST) 133, 143, 144, 153 need appropriate software and control revisions to not alarm or error when no reverse path transmission on the traffic channel is received from the communique device (mobile or fixed). For the provision of subscription or toll services via the non-interactive bidirectional transmission with subscriber registration mode of operation of the present communique system for cellular communication networks 100, a plurality of cells transmit Communique signals, with each cell using any frequency and any Walsh (PN) code for a selected Communique. This mode of operation enables the cellular communication system to select any repeat pattern of cells, any assignment of Walsh codes for a transmission to thereby enable not only free communique services but also subscription services. The wireless subscriber device 101 communicates with the base station 102 for registration purposes, but does not enter an interactive mode once registration is accomplished. Thus, the wireless subscriber device 101 does not require a unique MIN for this mode of operation, since the subscription billing and authorization can be implemented using the ESN and/or SSD of the wireless subscriber device 101.

The difference with this process compared to that of FIG. 7 is that the registration process of step 705 consists of the wireless subscriber device 101 transmitting the spoofing MIN as well as the SSD and/or ESN to the Base Station Subsystem 131 in a brief data exchange on the reverse CDMA paging channel to log the subscriber in to the selected subscription or toll services. The forward page to the wireless subscriber device 101 can include the Traffic channel identification of the subscribed services and the wireless subscriber device 101 responds on the reverse CDMA channel with the subscriber registration information. Much of the communications to effect soft handoff and registration can be carried in-band on the reverse CDMA channel.

Content Delivery

The content of the Communiques can vary widely and include but are not limited to: free information, subscription based information, toll based information, and the like, as noted above. The content can be locally generated or remotely generated, with the propagation of the information to the various cell sites being implemented in a number of ways. FIGS. 1A & 1B illustrate in block diagram form the overall architecture of a typical content delivery network for the present communique system for cellular communication networks 100. In particular, there is a Program Manager 113 that functions to receive the program source information from multiple sources and migrate information to selected cell sites for transmission to the subscribers served by these cell sites. The Spatial-Temporal Content Manager 114 defines the geographic area or demographic population or subscriber interest group that are the metrics used to transmit information to subscribers who populate the target audience for narrowcast transmissions. The Spatial-Temporal Content Manager 114 also can include the selection of frequencies and PN codes that are used by each cell site to transmit the Communiques to subscribers. The basic content delivery network is independent of the existing radio frequency cellular communication network, but is cooperatively operative with the cellular communication network. Thus, it is expected that part of the functionality described herein for the content delivery network can be part of or integrated with the cellular communication network, as a matter of expediency. The degree to which the content delivery network is incorporated into the cellular communication network or even into the communique system for cellular communication networks 100 varies and does not diminish the applicability of the concepts embodied in the communique system for cellular communication networks 100.

As shown in block diagram form in FIGS. 1A & 1B, the sources of data for the communique system for cellular communication networks 100 can be varied, and a few typical content sources are shown here to illustrate the concepts of the communique system for cellular communication networks 100. In particular, the communique system for cellular communication networks 100 is connected to a plurality of content sources. The sources can be a remotely located program source for providing for example network news, such as a national network station 122 which is connected via a satellite uplink 123 and satellite 124 to a satellite downlink 126 and forwarded to satellite interface 117 that is part of the communique system for cellular communication networks 100 or can use the Public Switched Telephone Network and trunk interface 116B. Alternatively, the program source can be a local program source 120 for local news and information, that is connected via a data communication medium, such as the Internet 107, to an Internet server interface 115 of the communique system for cellular communication networks 100. In addition, a program source, such as local program source 121 is connected via the Public Switched Telephone Network 108 to a trunk interface 116A of the communique system for cellular communication networks 100. In addition, a local terminal device 127 can be connected via interface 110 to the communique system for cellular communication networks 100 for inputting information. The various program sources provide information of various types, including but not limited to: news, advertisements, traffic, weather, travel information, and the like.

The communique system for cellular communication networks 100 also includes a local mass storage memory 119 for storing control instructions for use by processor 118 as well as program material received from the various program sources identified above. The communique system for cellular communication networks 100 is controlled by a processor complex which includes Spatial-Temporal Content Manager 114 to manage the definition of the cells to which a particular Communique is transmitted. Furthermore, communique system for cellular communication networks 100 includes Program Manager 113 to integrate information received from the various program sources into Communiques that are transmitted over selected Traffic channels of the forward CDMA channel within one or more cells as identified by the Spatial-Temporal Content Manager 114. The Communiques generated by the Program Manager 113 are transmitted to the various Base Station Subsystems 131–151 identified by the Spatial-Temporal Content Manager 114 either directly or via the associated Mobile Telephone Switching Office 106. The Program Manager 113 functions to assemble program streams as described below and transmits the program streams containing the Communiques via a selected communication medium, such as the Public Switched Telephone Network 108, using network interface 116A, or some other communication medium, such as an IP network.

Content Domain Narrowcast

Figure 8:
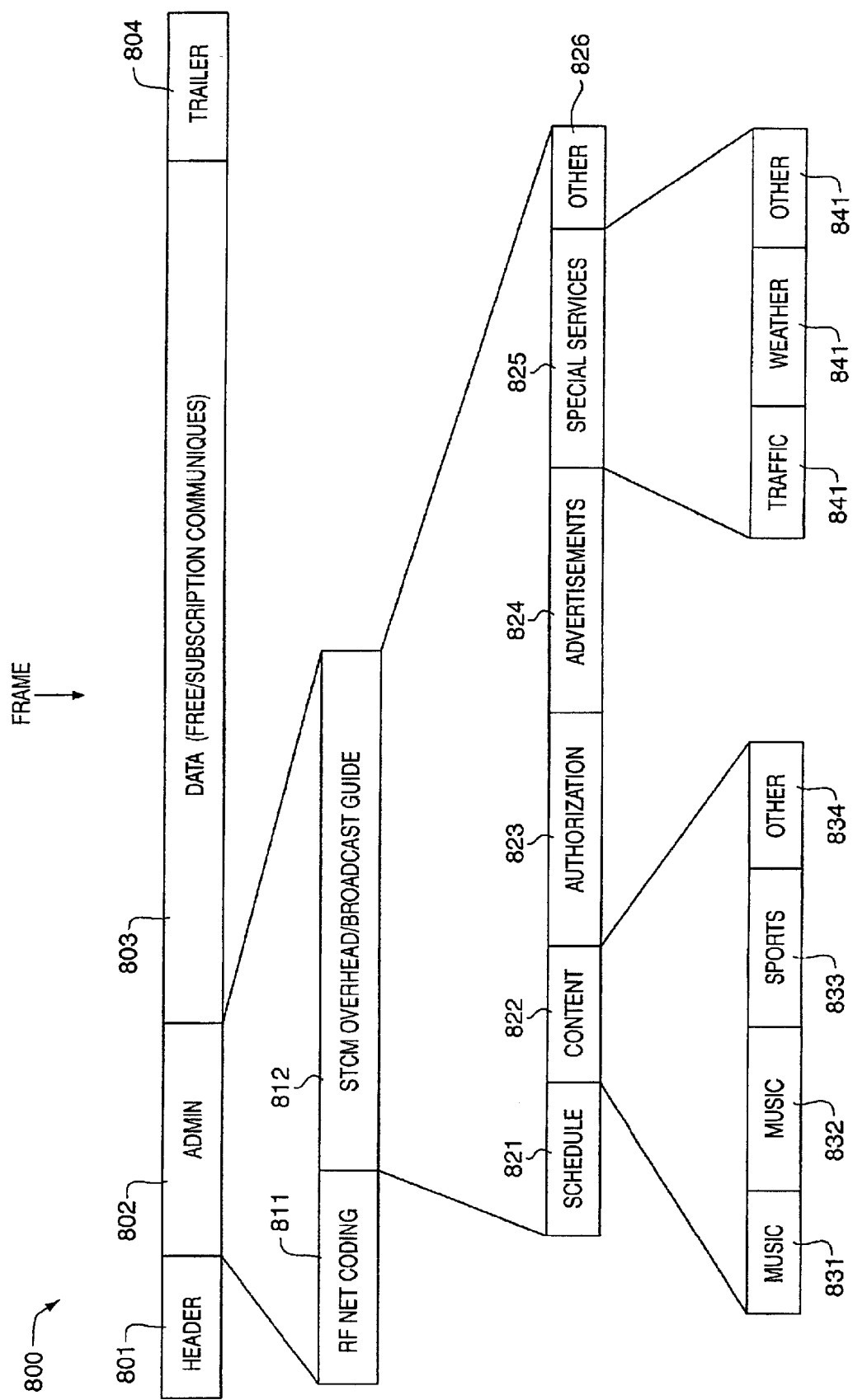
FIG. 8 illustrates in block diagram form a typical signaling protocol for a Traffic channel for use in the present communique system for cellular communication networks.
Figure 12:
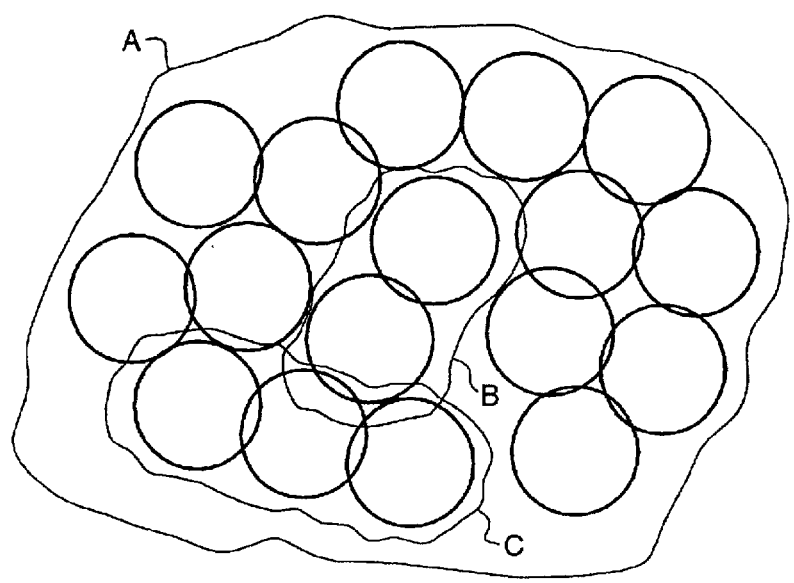
FIG. 12 illustrates a typical program coverage pattern.

An alternative to the use of centralized, predetermined Communiques that are formatted at the communique system for cellular communication networks 100 and transmitted via the Base Station Subsystems 132, 142, 152 to the wireless subscriber devices, the delivery of information can be effected by using the content domain as a distribution format. The content domain enables the communique system for cellular communication networks 100 to achieve a dynamic, changeable broadcast narrowcast without modifying or reconfiguring the RF network domain. In particular, a broadband program stream containing all information for all cells can be created by the Spatial-Temporal Content Manager 114. This information, such as that described below with respect to FIG. 8, is delivered to the Mobile Telephone Switching Office 106 for distribution to all relevant Base Station Subsystems 132, 142, 152. The Base Station Subsystems 132, 142, 152 can either parse the information contained in the frame into a plurality of Communiques for transmission in their cells, such as the plurality of cells included in coverage areas A–C shown on FIG. 12. Alternatively, the information can be passed directly to the wireless subscriber devices for parsing therein. However, it is expected that the bandwidth limitations in the communication link from the Base Station Subsystems 132, 142,152 to the wireless subscriber devices render the former parsing scheme preferable to parsing at the wireless subscriber device. Yet another alternative is the hierarchical parsing of the information, where the Base Station Subsystems 132, 142, 152 parse the received information frame into a plurality of subframes of similar format and reduced content for transmission to the wireless subscriber devices for further parsing of the subframes into the individual Communiques.

The above-described process utilizes the available bandwidth to provide the wireless subscriber devices with the information necessary to produce a number of Communiques as desired by the subscriber, thereby eliminating the need for the Base Station Subsystems 132, 142, 152 to communicate with the wireless subscriber devices to switch channels to access other Communiques. This distributed switching and hierarchical information delivery architecture thereby reduces the Paging channel traffic for the Base Station Subsystems 132, 142, 152.

The Spatial-Temporal Content Manager 114 controls the actual information that is transmitted from each cell site by sending program stream parsing control signals to routers contained in the Base Station Controllers 132, 142, 152 at each cell site which then, on a distributed basis, re-assemble the broadband program stream containing all information for all cells into a data stream that is only relevant for that particular cell. By grouping cells as shown on FIG. 12 into "content similar blocks" or more specifically coverage areas A–C, the Spatial-Temporal Content Manager 114 has commanded the routers at the cell sites to parse the broadband program stream identically for the grouped cells (as pre-defined by the systems programming or a content programming operator), the effect of a narrowcast can be achieved without modifying the RF network architecture. From the subscriber's perspective, he is only receiving narrowcast information when in the grouped cells'transmission range. And, as the subscriber moves from one region to another, the broadcast/narrowcast Communique received may be different depending on the spatial programming of the Spatial-Temporal Content Manager 114. Also, over time, a given narrowcast region may change in its physical shape or disappear altogether.

Figure 11:
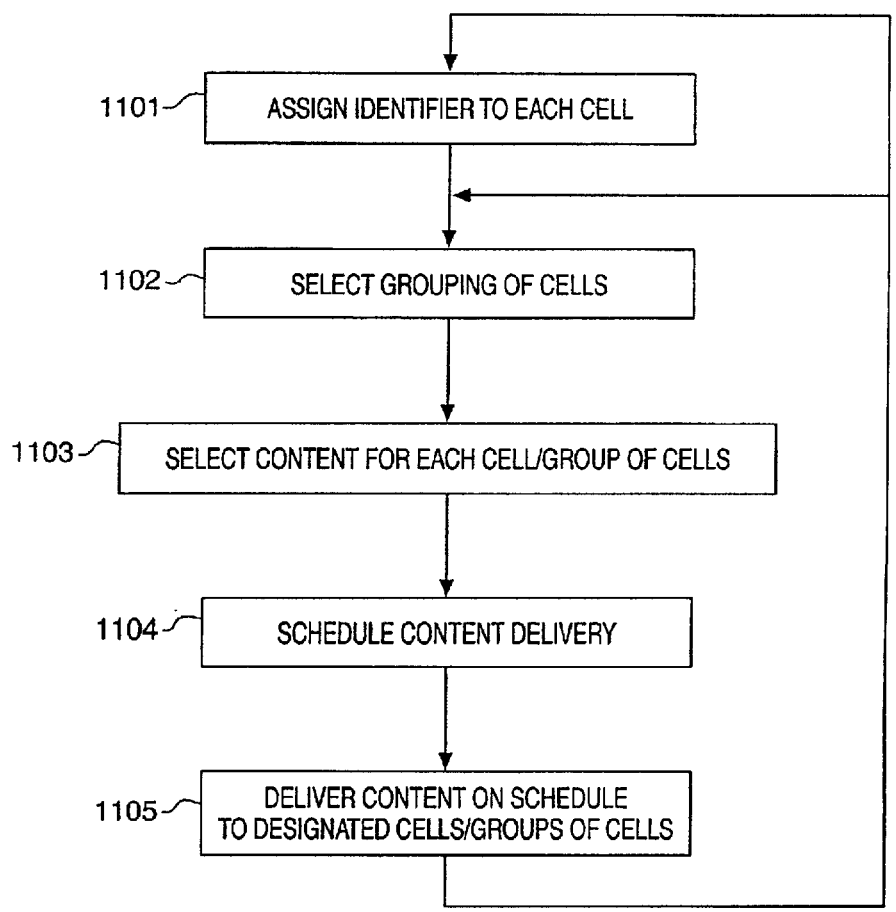
FIG. 11 illustrates in flow diagram form the operation of the Spatial-Temporal Content Manager.

The operation of this Spatial-Temporal Content Manager 114 is illustrated in flow diagram form in FIG. 11 where at step 1101 each cell in the cellular communication network the is served by the communique system for cellular communication networks 100 is assigned a unique address, using a selected protocol, such as TCP/IP. At step 1102, the cells are grouped into collections comprising coverage areas. The program content in the form of Communiques are selected at step 1103 and assigned to destinations, using the cell addresses assigned at step 1101. At step 1104, the Communique schedule is defined in terms of time of transmission, duration of transmission, duration of narrowcast region, temporal and/or spatial characteristics of narrowcast region, and the like. Finally, at step 1105, the identified Communiques are transmitted to the selected cells using the assigned cell addresses. The transmission can occur on a real time basis where the Communiques are provided to the cells at the time they are to be broadcast, or the Communiques can be distributed in advance of transmission and stored for future transmission. The process of FIG. 11 then returns to either step 1101 where address information is updated as needed or step 1102 where the cell groupings are modified and the process cycles through the above-noted steps as required.

One disadvantage of this particular distributed re-assembly approach is with a CDMA architecture designed to operate in soft or softer handoff (this limitation is not present in an analog or TDMA architecture since they do not operate in soft handoff). Since the data streams must be identical for the wireless subscriber device to operate in soft handoff, as a subscriber transitions form the boundary of one narrowcast region to another, the number of cell sites available to be in soft handoff is varying and could be zero.

One method for solving this limited shortcoming is to broadcast the broadband content stream from all sites all the time and put the router function within the wireless subscriber device itself. Commands on how to re-assemble the content is based on an subscriber's physical location and the signaling is done on an in-band basis (i.e. the data parsing commands are contained within the traffic channel in a TDM fashion). This reduces the effective available bandwidth for a narrowcast since much of the broadband content is not for a given subscriber and is "thrown" away by a given subscriber. It also places higher computing power at the wireless subscriber device in order to parse the data. Again, if soft handoff isn't required for reliable CDMA operation, the aforementioned limitation isn't a concern and parsing can be done at the cell site. And, in either parsing scheme, distributed at the cell site or distributed at the wireless subscriber device, if the content is overlaid on an analog or TDMA network, the soft handoff limitation is not an issue.

Management of Spatial-Temporal Control of Distributed Content

Conceptually, the programming of the broadcast/narrowcast regions for management by the Program Manager 113 is done initially by content operators (people) who pre-program the system for content distribution. As a general principle, the content can be classified into groups such as:

Diurnal Narrrowcasts (e.g. AM/PM traffic reports along highways)
Special Narrowcasts (e.g. football game, art-in-the-park)
Campuses (e.g. schools, work complexes)
General (e.g. news weather sports)
Other Much of the programming is repetitive and only needs to done once i.e. a diurnal narrowcast. One-time only events can be programmed in advance, and say for a football game, can retain all of the programming features such as it's spatial coverage extent, and only need to be recalled and given a new narrowcast execution time window. From a user interface perspective, imagine a GUI that displays all of the cells available for a broadcast/narrowcast wherein an operator can select given cells to form a narrowcast region. This region is then saved as a narrowcast group. Next, the operator goes to another GUI screen that contains all available broadcast information and selects which content files are appropriate for the narrowcast group just previously designed. Last, the operator defines the time window for the narrowcast. By repeating this process and building a database of spatial, temporal and content information, all requisite knowledge is programmed into the system for a 24 hour 7 day operation in the Spatial-Temporal Content Manager.

Figure 5:
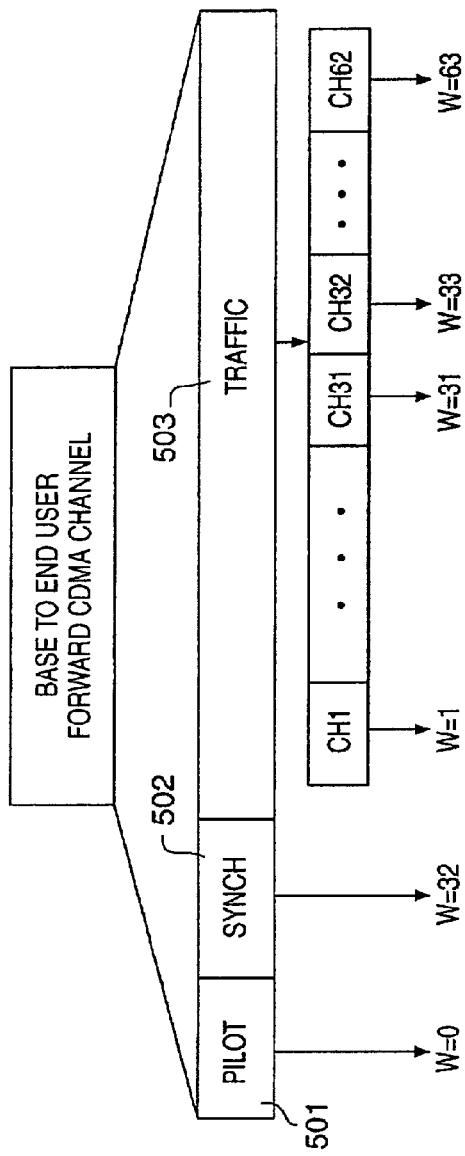
FIG. 5 illustrates in block diagram form a typical configuration of the base to end user forward CDMA channel used in cellular communication networks.

The database, at a minimum, has the following fields:
Start Time
Stop Time
Narrowcast Cell Grouping
Broadcast Cell Grouping
Narrowcast Content Stream
Broadcast Content Stream
Other Format of the Forward CDMA Channel for Communique Architectures FIG. 5 illustrates in block diagram form a typical configuration of the Base Station Subsystem 131 to wireless subscriber device 101 forward CDMA channel used for Communique transmissions in cellular communication networks. As noted above, the typical Base Station Subsystem 131 to wireless subscriber device 101 forward CDMA channel comprises a predefined bandwidth centered about a selected carrier frequency. The bandwidth of the selected channel as well as the selected carrier frequency is a function of the technical implementation of the base station of the cellular network and is not discussed further herein. The communication space for Communique transmissions is typically divided into a plurality of segments: Pilot 501, Synchronization (Synch) 502, Traffic 503. The Traffic 503 segment is further divided into a plurality of channels Ch1–Ch62. Each traffic channel represents a communication space for a selected wireless subscriber device 101. The plurality of traffic channels CH1–CH62 as shown in FIG. 5 are assigned the remaining Walsh codes. Each Traffic channel consists of data traffic as well as in band signaling transmitted from the Base Station Subsystem 131 to the wireless subscriber device 101, as noted above.

Typical Content Transmission Format

FIG. 8 illustrates in block diagram form a typical signaling protocol for use in the present communique system for cellular communication networks 100. A frame 800 can be used to transmit both content as well as control information and a broadcast guide. The frame 800 is shown in one typical form, although the particulars of the frame 800 can vary as a function of the use of this element. In particular as noted above, a broadband program stream containing all information for all cells can be created by the Spatial-Temporal Content Manager 114. This information is delivered to the Mobile Telephone Switching Office 106 via a communication medium, such as the Public Switched Telephone Network 108, for distribution to all relevant Base Station Subsystems 132, 142,152. The Base Station Subsystems 132, 142, 152 can either parse the information contained in the frame into a plurality of Communiques for transmission in their cells, such as the plurality of cells included in coverage areas A–C shown on FIG. 12. Alternatively, the information can be passed directly to the wireless subscriber devices for parsing therein. Yet another alternative is the hierarchical parsing of the information, where the Base Station Subsystems 132, 142, 152 parse the received information frame into a plurality of subframes of similar format and reduced content for transmission to the wireless subscriber devices for further parsing of the subframes into the individual Communiques.

The frame 800 has a plurality of constituent parts, including a Header 801, Administration 802, Data 803 and Trailer 804. The Header 801 and Trailer 804 are used to identify the beginning and end of the Frame 800 and can include error check bits to ensure proper transmission of the data. The Administration 802 is used to convey various control information to the Base Station Subsystem and to the wireless subscriber device. The Administration 802 can include a Radio Frequency Configuration segment 811 which defines the Traffic channel on which the frame is to be broadcast. The remaining segments of the Administration 802 consist of a "Program Guide" 812 which includes a schedule segment 821 to define the time at which the frame is to be transmitted and the information parsing data, content definition segment 822 the defines the content of the data section 803 of the frame 800 (and optionally the information parsing data), Authorization segment 823 which defines the type of service associated with the content of the data section 803 of the frame 800. Advertisements 824 can also be included in the Program Guide 812, along with optional special services 825, such as traffic reports 841, public service announcements 842 and the like 843. Other segments 826 can optionally be included. In the content segment 822, the content definitions describe the information that is available, and a plurality of such elements are shown to illustrate this concept, including but not limited to: music 831, 832, sports 833 and other programs 834.

It is evident that this example of a format is simply an illustration and it is expected that numerous variations can be implemented that fall within the scope of the concept taught herein. In particular, in the case of hierarchical parsing, the frame that is transmitted to the wireless subscriber device would be a reduced content version of frame 800, since the content would be reduced to match the bandwidth capabilities of the communication link from the Base Station Subsystems 132, 142, 152 to the wireless subscriber devices.

Examples of Narrowcast Dynamic Coverage Areas

Figure 9:
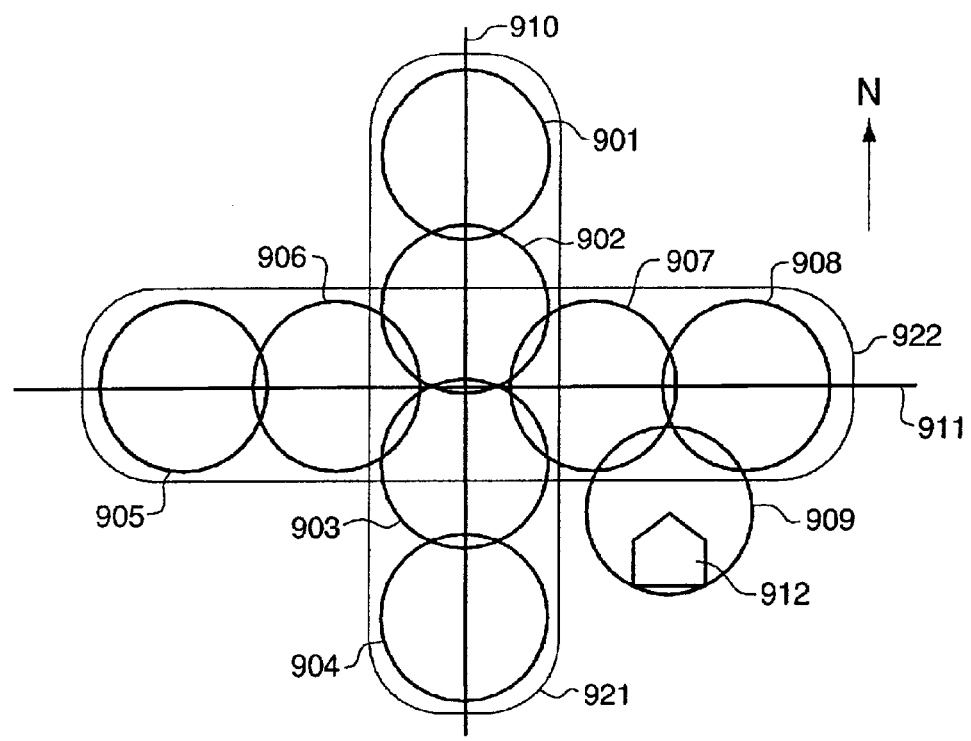
FIGS. 9 & 10 illustrate typical dynamic coverage areas for various types of communique transmissions.
Figure 10:
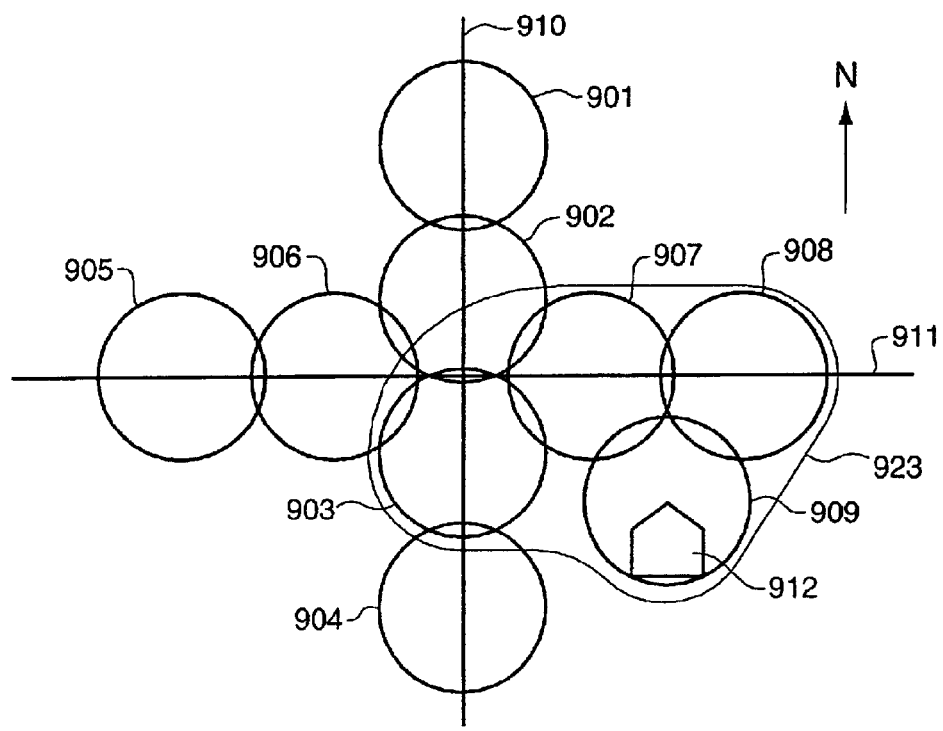

FIGS. 9–10 illustrate typical dynamic coverage areas for various types of Communique transmissions. As an example of the capabilities of the communique system for cellular communication networks 100, FIGS. 9 and 10 illustrate a typical operating environment for this system under dynamically changing conditions. For example, there can be an entertainment complex or sports stadium 912 located proximate two major arterial roads, such as North-South oriented highway 910 and East-West oriented highway 911. There are typically a plurality of cells that provide cellular communication services in the area encompassed by the elements shown in FIG. 9. For example, cells 901–904 provide cellular communication services for subscribers who are traveling on North-South oriented highway 910 while cells 905–908 provide cellular communication services for subscribers who are traveling on East-West oriented highway 911. A cell 909 provides cellular communication services for subscribers who are located at or around entertainment complex 912 and when the entertainment complex 912 is not in use, the cellular communication traffic in cell 909 is minimal. The other cells also are subject to varying traffic and, for example, during a morning rush hour traffic the cells 901–904 can be collected into a narrowcast coverage area 921 while the cells 905–908 can be collected into a narrowcast coverage area 922. Thus, subscribers traveling on North-South oriented highway 910 can receive traffic status information via narrowcast coverage area 921 and subscribers traveling on East-West oriented highway 911 can receive traffic status information via narrowcast coverage area 922. Later in the day, when people are leaving the entertainment complex 912 and entering both the North-South oriented highway 910 and East-West oriented highway 911, then the communique system for cellular communication networks 100 can reconfigure the narrowcast coverage areas to encompass cells 903, 907–909 into a narrowcast coverage area 923 to provide traffic status information relating to the outflow of traffic from the entertainment complex 912. As the traffic propagates outward from the entertainment complex 912, the communique system for cellular communication networks 100 can reconfigure the narrowcast coverage areas to also encompass cells 902, 904, 906. The communique system for cellular communication networks 100 can dynamically adapt the extent of narrowcast coverage area 923 in response to the dispersion of the traffic and, for example, once the entertainment complex 912 is emptied, cell 909 can be dropped from the extent of narrowcast coverage area 923.

The dynamic adaptation of the narrowcast coverage areas and the selection of information transmitted to subscribers located in these narrowcast coverage areas is accomplished by the communique system for cellular communication networks 100, operating in cooperation with the Mobile Telephone Switching Office 106. The Program Manager 113 and the Spatial-Temporal Communique Manager 114 operate to determine: the presence of subscribers in a particular cell, the presence of external events, the movement of the subscribers from cell to cell, the available programs that are to be transmitted to the subscribers, and then process this information to create the Communiques and the narrowcast coverage areas. This is accomplished in part by the communication between the communique system for cellular communication networks 100, operating in cooperation with the Mobile Telephone Switching Office 106 in which the above-noted information is exchanged. In addition, the communique system for cellular communication networks 100 maintains data in memory 119 that defines the call coverage area of the cells so that the external events can be mapped to locales and their associated serving cells.

Program Stream Management

Figure 13:
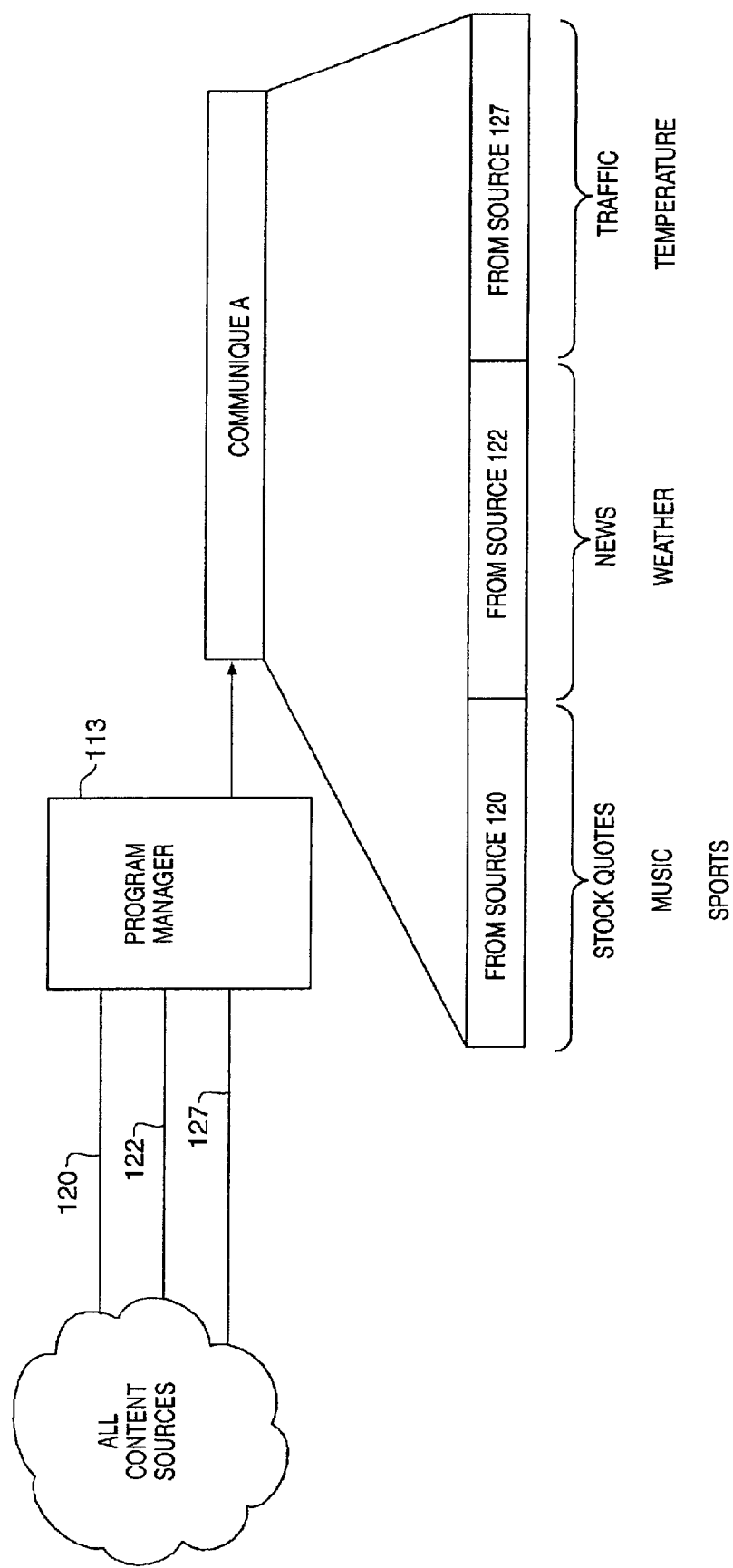
FIG. 13 illustrates a typical program stream for a plurality of communication channels.

FIG. 13 illustrates a typical stream for a plurality of communication channels and FIG. 14 illustrates in tabular form a typical definition of a plurality of narrowcasts applicable to the program streams of FIG. 13 as applied to the typical dynamic coverage areas of FIGS. 9 & 10. Communiques are formed by the Program Manager, 113, and the Spatial Temporal Communique Manager 114, and delivered to the cellular system via the Public Switched Telephone Network 108, which is comprised of a grouping of various architectures (circuit, packet switched (e.g. TCP/IP), ATM, frame relay, satellite and so on) to convey the information from the Communique System 100, to the Mobile Telephone Switching Office 106, to Base Station Subsystem 131,141,151 and ultimately to Base Station Transceiver 133,143,144,153 for transmission as a broadcast/narrowcast Communique to the various wireless subscriber devices. The communiques can be labeled in any manner appropriate for composite system operation, and for this example, the communiques are given alpha designators (A, B, C and so on). A given Communique may have spatial relevance and could be delivery targeted by the Spatial Temporal Communique Manager 114, to a specific region as described in FIGS. 9 & 10.

As shown in FIG. 13, the example Communique A comprises programming from sources:

National Source 122, content residing at key media nodes (in a centralized manner);

Regional Source 120, content residing at a plurality of media nodes attached to the Internet (in a centralized/decentralized manner);

Local Source 121, content residing at a plurality of media nodes connected via the Local Exchange Carrier (in a decentralized manner);

Local Source 127, content residing at end-user nodes (in a decentralized manner).

The content from Regional Source 120 is diverse in its substance and embodies the plethora of media available on the Internet (data, stock quotes, music, video, email, special interest, sports, news and so on). The content from National Source 122 comprises more general information that is applicable to many communiques such as news, weather and sports. The content from Local Source 127 is information gathered and conveyed by the end-user in an active or passive mode. An example of Active information is identifying that a particular lane on a particular highway is blocked. Passive information may be reporting of outside air temperature.

To generate Communique A as shown in FIG. 13, the Program Manager 113, collects and collates all available content from sources 120, 122 and 127 from the universe of All Content Sources and forms/creates/parses 120, 122 and 127 to the desired, predetermined information stream thereby creating Communique A. In this example, it is desired to deliver Communique A to narrowcast region 910. This is the responsibility of the Spatial Temporal Communique Manager 114.

Communique A contains the following content in this example:

From Regional Source 120:
stock quotes (free to the end-user)
music (channelized) (free/subscription to the end-user)
composite traffic flow map (subscription to the end-user)
other
From National Source 122:
news (free to the end user)
weather (free to the end user)
sports (free to the end user)
other
From Local Source 127:
end-user traffic data (free to the network)
end-user temperature data (free to the network)
other Each individual content stream can also contain advertising (typical for a free service). Typical subscription services would not contain advertising.

The Spatial Temporal Content Manager (STCM) 114, receives all Communiques from the Program Manager 113, and assigns the communiques for a given period of time to given cells to form narrowcast regions in the time domain. As described in FIG. 14, Communique A, which is the data payload for 803 delivered to narrowcast region 910, is but one of many Communique—Narrowcast—Time pairings that occurs in the Spatial Temporal Communique Manager 114. In addition to Communique A, FIG. 14 describes:

Communique B is a diurnal narrowcast covering region 922.

Communique C is a special event narrowcast in region 909 for entertainment complex 912.

In this example, Communiques A & B are repeated daily. Observe that cells 903, 906, 902, 907 are transmitting both Communiques A & B. For these overlapping narrowcast regions, data payload 803 contains both Communiques A & B.

At a time different than given for FIG. 9, FIG. 10 describes new narrowcast regions formed by the Spatial Temporal Communique Manager 114. These narrowcast regions are served with information contained in communiques M & N which is the payload 803 for narrowcast regions 923 and 909, respectively.

The Spatial Temporal Communique Manager 114, through repetitive programming, ensures that all cells, whether stand-alone or grouped into a narrow-cast region, have content available 24 hours per day 7 days per week.

The programming described herein is deterministic meaning the content contained within a Communique, where a Communique is transmitted and how long a communique is transmitted is pre-programmed by the network operator. Another embodiment concerns dynamic active feedback from end-users within a given narrowcast region to "inform" the Spatial Temporal Communique Manager 114, whether or not they are within the narrowcast region. For instance, let's say that the Spatial Temporal Communique Manager 114, learns that all end-users have left the entertainment complex located in region 909 delivering Communique C because the baseball game ended earlier than scheduled. The Spatial Temporal Communique Manager 114, can be embodied with a form of artificial intelligence to not only change the narrowcast region earlier than scheduled but also change the content, or Communique within the new region. An example would be to expand the Communique region along highway arterials leaving the stadium, change the Communique content and insert advertising for restaurants for hungry ball game spectators.

SUMMARY

The communique system for cellular communication networks operates with existing cellular communication networks to provide communique communication services to subscribers. The Communique can be unidirectional (broadcast) or bidirectional (interactive) in nature and the extent of the Communique can be network-wide or narrowcast, where one or more cells and/or cell sectors are grouped to cover a predetermined geographic area or demographic population or subscriber interest group to transmit information to subscribers who populate the target audience for the narrowcast transmissions.

What is claimed:

1. A communiqué system for providing a communiqué, constituting program content concurrently delivered to a plurality of subscribers, who are equipped with wireless subscriber devices, via a cellular communication network that includes a plurality of cell sites, each of which provides a plurality of wireless communication channels in a cell that covers a predetermined volume of space around a cell site transmitting antenna, comprising:
   means for receiving program content from a plurality of program sources;
   means for selecting at least one of said plurality of cells to provide a communiqué to a plurality of subscribers who are authorized to receive said communiqué and who are served by said selected at least one of said plurality of cells, independent of the presence of subscribers who are authorized to receive said communiqué and who are served by other cells of said cellular communication network; and
   means for routing program content, constituting said communiqué from at least one of said plurality of program sources to cell sites associated with said selected at least one of said plurality of cells for concurrent transmission via a one of said plurality of wireless communication channels to a plurality of wireless subscriber devices of subscribers who are authorized to receive said communiqué and who are served by said selected at least one of said plurality of cells to provide said communiqué communication service.

2. The communiqué system of claim 1 wherein said means for routing comprises:
   means for combining said received program content into a plurality of program streams, each of which comprises at least one media from the class of media including: audio, video, graphics, text, data.

3. The communiqué system of claim 2 further comprising:
   means for transmitting a program stream to said cell sites associated with said selected at least one of said plurality of cells; and
   wherein said means for routing further comprises:
   means for transmitting program stream parsing control signals to said cell sites associated with said at least one of said plurality of selected cells to define at least one communiqué that is excerpted from said program stream in said cell sites associated with said selected at least one of said plurality of cells.

4. The communiqué system of claim 3 further comprising:
   means, located in said at least one of said plurality of cell sites, for generating a plurality of communiques from said received program stream and said program stream parsing control signals; and
   means for transmitting said plurality of communiques to said plurality of wireless subscriber devices served by said selected at least one of said plurality of cells.

5. The communiqué system of claim 2 further comprising:
   means for transmitting a program stream to said plurality of wireless subscriber devices served by said selected at least one of said plurality of cells; and
   wherein said means for routing further comprises: means for transmitting program stream parsing control signals to said plurality of wireless subscriber devices served by said selected at least one of said plurality of cells to define at least one communiqué that is excerpted from said program stream.

6. The communiqué system of claim 5 further comprising:
   means for generating a plurality of subframes from said received program stream and said program stream parsing control signals for transmission to said plurality of wireless subscriber devices served by said selected at least one of said plurality of cells.

7. The communiqué system of claim 6 further comprising:
   means for generating program stream subframe parsing control signals to define at least one communiqué that is excerpted from a subframe of said program stream; and
   means for transmitting said received program stream subframe and said program stream subframe parsing control signals to said plurality of wireless subscriber devices served by said selected at least one of said plurality of cells.

8. The communiqué system of claim 1 wherein said means for routing comprises:
   means for dividing a communication space in at least two dimensions to create said plurality of communication channels for carrying data; and
   means for transmitting each said received program content in a selected one of said communication channels.

9. The communiqué system of claim 8 wherein said means for dividing comprises:
   means for dividing a communication space in time, frequency and code domains to create said plurality of communication channels, each comprising a plurality of communication segments for carrying data.

10. The communiqué system of claim 9 wherein said received program content comprises communiqué transmissions and at least one of the classes of transmissions: voice, and data transmissions, said means for routing further comprises:

means for assigning at least one of said plurality of communication channels exclusively for use in transmitting each of said at least two classes of transmissions; and means for transmitting each of said received program content comprising at least two of: voice, data and communiqué transmissions in said associated assigned ones of said plurality of communication channels.

11. The communiqué system of claim 10 wherein said means for assigning reserves at least one of said plurality of communication channels for use on a non-exclusive basis for use in transmitting each of said at least two classes of transmissions.

12. The method of claim 8 wherein said step of routing comprises:

dividing a communication space in at least two dimensions to create said plurality of communication channels for carrying data; and transmitting each of a plurality of program content segments which are created from said received program content in a selected one of said communication channels.

13. The method of claim 12 wherein said step of dividing comprises:

dividing a communication space in time, frequency and code domains to create said plurality of communication channels, each comprising a plurality of communication segments for carrying data.

14. The method of claim 13 wherein said received program content comprises communiqué transmissions and at least one of the classes of transmissions: voice, audio, video and data transmissions, said step of routing further comprises:

assigning at least one of said plurality of communication channels exclusively for use in transmitting each of at least two of said classes of transmissions; and transmitting each of said program content segments comprising at least two of: voice, audio, video, and data transmissions in said associated assigned ones of said plurality of communication channels.

15. The method of claim 14 wherein said step of routing further comprises:

reserving at least one of said plurality of communication channels for use on a non-exclusive basis for use in transmitting each of at least two classes of transmissions.

16. The communiqué system of claim 1 wherein said router means comprises:

subframe generating means for dividing a communication space in at least two dimensions to create said plurality of communication channels for carrying data; and transmitter means for transmitting each of a plurality of program content segments which are created from said received program content in a selected one of said communication channels.

17. The communiqué system of claim 16 wherein said subframe generating means comprises:

domain parsing means for dividing a communication space in time, frequency and code domains to create said plurality of communication channels, each comprising a plurality of communication segments for carrying data.

18. The communiqué system of claim 17 wherein said received program content comprises communiqué transmissions and at least one of the classes of transmissions: voice, and data transmissions, said router means further comprises:

channel assignment means for assigning at least one of said plurality of communication channels exclusively for use in transmitting each of said at least two classes of transmissions; and transmitter means for transmitting each of said program content segments comprising at least two of: voice, data and communiqué transmissions in said associated assigned ones of said plurality of communication channels.

19. The communiqué system of claim 18 wherein said channel assignment means reserves at least one of said plurality of communication channels for use on a non-exclusive basis for use in transmitting each of said at least two classes of transmissions.

20. A method of operating a communiqué system for providing a communiqué, constituting program content concurrently delivered to a plurality of subscribers, who are equipped with wireless subscriber devices, via a cellular communication network that includes a plurality of cell sites, each of which provides a plurality of wireless communication channels in a cell that covers a predetermined volume of space around a cell site transmitting antenna, comprising:

receiving program content from a plurality of program sources;

selecting at least one of said plurality of cells to provide a said communiqué to a plurality of subscribers who are authorized to receive said communiqué and who are served by said selected at least one of said plurality of cells, independent of the presence of subscribers who are authorized to receive said communiqué and who are served by other cells of said cellular communication network; and routing program content from at least one of said plurality of program sources to said selected cell sites for concurrent transmission to wireless subscriber devices of subscribers who are authorized to receive said communiqué and who are served by said selected cells, in at least one of said selected cells said transmission to said plurality of wireless subscriber devices being effected concurrently to more than one of said plurality of wireless subscriber devices via a one of said plurality of wireless communication channels.

21. The method of claim 20 wherein said step of routing comprises:

combining said received program content into a plurality of program streams, each of which comprises at least one media from the class of media including: audio, video, graphics, text, and data.

22. The method of claim 21 further comprising:

transmitting a program stream to said cell sites associated with said selected at least one of said plurality of cells; and wherein said step of routing further comprises:

transmitting program stream parsing control signals to said cell sites associated with said at least one of said plurality of cells to define at least one communiqué that is excerpted from said program stream in said cell sites associated with said selected at least one of said plurality of cells.

23. The method of claim 22 further comprising:

generating, in said at least one of said plurality of cell sites, a plurality of communiqués from said received program stream and said program stream parsing control signals; and transmitting said plurality of communiqués to said plurality of wireless subscriber devices served by said selected at least one of said plurality of cells.

24. The method of claim 21 further comprising:

transmitting a program stream to said plurality of wireless subscriber devices served by said selected at least one of said plurality of cells; and wherein said step of routing further comprises:

transmitting program stream parsing control signals to said plurality of wireless subscriber devices served by said selected at least one of said plurality of cells to define at least one communiqué that is excerpted from said program stream.

25. The method of claim 24 further comprising:

generating a plurality of subframes from said received program stream and said program stream parsing control signals for transmission to said plurality of wireless subscriber devices served by said selected at least one of said plurality of cells.

26. The method of claim 25 further comprising:

generating program stream subframe parsing control signals to define at least one communiqué that is excerpted from a subframe of said program stream; and transmitting said received program stream subframe and said program stream subframe parsing control signals to said plurality of wireless subscriber devices served by said selected at least one of said plurality of cells.

27. The method of claim 26 wherein said step of routing comprises:

dividing a communication space in at least two dimensions to create said plurality of communication channels for carrying data; and transmitting each said received program content in a selected one of said communication channels.

28. The method of claim 27 wherein said step of dividing comprises:

dividing a communication space in time, frequency and code domains to create said plurality of communication channels, each comprising a plurality of communication segments for carrying data.

29. The method of claim 28 wherein said received program content comprises communiqué transmissions and at least one of the classes of transmissions: voice, and data transmissions, said step of routing further comprises:

assigning at least one of said plurality of communication channels exclusively for use in transmitting each of said at least two classes of transmissions; and transmitting each of said received program content comprising at least two of: voice, audio, video, data and communiqué transmissions in assigned ones of said plurality of communication channels.

30. The method of claim 29 wherein said step of routing further comprises:

reserving at least one of said plurality of communication channels for use on a non-exclusive basis for use in transmitting each of said at least two classes of transmissions.

31. A communiqué system for providing a communiqué constituting program content concurrently delivered to a plurality of subscribers, who are equipped with wireless subscriber devices, via a cellular communication network that includes a plurality of cell sites, each of which provides a plurality of wireless communication channels in a cell that covers a predetermined volume of space around a cell site transmitting antenna, comprising:

program manager means for receiving program content from a plurality of program sources;

processor means for selecting at least one of said plurality of cell sites to provide a communiqué to a plurality of subscribers who are authorized to receive said communiqué and who are served by said selected cells, independent of the presence of subscribers who are authorized to receive said communiqué and who are served by other cells of said cellular communication network; and router means for routing program content, constituting said communiqué, from at least one of said plurality of program sources to said selected cell sites for concurrent transmission to a plurality of wireless subscriber devices of subscribers who are authorized to receive said communiqué and who are served by said selected cells, in at least one of said selected cells said transmission to said plurality of wireless subscriber devices being effected concurrently to more than one of said plurality of wireless subscriber devices via a one of said plurality of wireless communication channels.

32. The communiqué system of claim 31 wherein said router means comprises:

content scheduling means for combining said received program content into a plurality of program streams, each of which comprises at least one media from the class of media including: audio, video, graphics, text, and data.

33. The communiqué system of claim 32 further comprising:

distribution means for transmitting a program stream to cell sites associated with said selected at least one of said plurality of cells; and wherein said router means further comprises;

content parsing means for transmitting program stream parsing control signals to said cell sites associated with said at least one of said plurality of selected cells to define at least one communiqué that is excerpted from said program stream in said cell sites associated with said selected at least one of said plurality of cells.

34. The communiqué system of claim 33 further comprising:

communiqué generation control means, located in said at least one of said plurality of cell sites, for generating a plurality of communiqués from said received program stream and said program stream parsing control signals; and transmitter means for transmitting said plurality of communiqués to said plurality of wireless subscriber devices served by said selected at least one of said plurality of cells.

35. The communiqué system of claim 32 further comprising:

content migration means for transmitting a program stream to said plurality of wireless subscriber devices served by said selected at least one of said plurality of cells; and wherein said router means further comprises;

communiqué content parsing means for transmitting program stream parsing control signals to said plurality of wireless subscriber devices served by said selected at least one of said plurality of cells to define at least one communiqué that is excerpted from said program stream.

36. The communiqué system of claim 35 further comprising:
- subframe generating means for generating a plurality of subframes from said received program stream and said program stream parsing control signals for transmission to said plurality of wireless subscriber devices served by said selected at least one of said plurality of cells.

37. The communiqué system of claim 36 further comprising:
- subframe control means for generating program stream subframe parsing control signals to define at least one communique that is excerpted from a subframe of said program stream; and
- transmitter means for transmitting said received program stream subframe and said program stream subframe parsing control signals to said plurality of wireless subscriber devices served by said selected at least one of said plurality of cells.

38. The communiqué system of claim 31 wherein said router means comprises:
- subframe generating means for dividing a communication space in at least two dimensions to create said plurality of communication channels for carrying data; and
- transmitter means for transmitting each said received program content in a selected one of said communication channels.

39. The communiqué system of claim 38 wherein said subframe generating means comprises:
- domain parsing means for dividing a communication space in time, frequency and code domains to create said plurality of communication channels, each comprising a plurality of communication segments for carrying data.

40. The communiqué system of claim 39 wherein said received program content comprises communiqué transmissions and at least one of the classes of transmissions: voice, audio, video and data transmissions, said router means further comprises:
- channel assignment means for assigning at least one of said plurality of communication channels exclusively for use in transmitting each of at least two classes of transmissions; and
- transmitter means for transmitting each of said received program content comprising at least two of: voice, audio, video, data and communiqué transmissions in assigned ones of said plurality of communication channels.

41. The communiqué system of claim 40 wherein said channel assignment means reserves at least one of said plurality of communication channels for use on a non-exclusive basis for use in transmitting each of said at least two classes of transmissions.

* * * * *